United States Patent [19]
Leavitt et al.

[11] Patent Number: 5,838,899
[45] Date of Patent: Nov. 17, 1998

[54] DIGITAL DATA PROCESSING METHODS AND APPARATUS FOR FAULT ISOLATION

[75] Inventors: William I. Leavitt, Lexington; Conrad R. Clemson, Shrewsbury; Jeffrey S. Somers, Northboro; John M. Chaves, Hudson; David R. Barbera; Shawn A. Clayton, both of Worcester, all of Mass.

[73] Assignee: Stratus Computer, Marlboro, Mass.

[21] Appl. No.: 658,563

[22] Filed: Jun. 5, 1996

Related U.S. Application Data

[63] Continuation-in-part of Ser. No. 309,210, Sep. 20, 1994, Pat. No. 5,630,056.

[51] Int. Cl.$^6$ .................................................. G06F 11/00
[52] U.S. Cl. .............................. 395/185.09; 395/182.04; 395/183.19; 395/308; 395/840
[58] Field of Search .................. 395/185.09, 183.19, 395/183.2, 184.01, 308, 185.01, 182.09, 185.02, 280, 281, 821, 822, 823, 825, 840, 182.04; 371/20.1, 68.1, 68.2

[56] References Cited

U.S. PATENT DOCUMENTS

| | | | |
|---|---|---|---|
| 4,453,215 | 6/1984 | Reid | 395/182.09 |
| 4,486,826 | 12/1984 | Wolff et al. | 395/182.07 |
| 4,597,084 | 6/1986 | Dynneson et al. | 371/51.1 |
| 4,750,177 | 6/1988 | Hendrie et al. | 371/32 |
| 4,931,922 | 6/1990 | Baty et al. | 395/182.07 |
| 5,249,187 | 9/1993 | Bruckert et al. | 395/182.09 |
| 5,313,627 | 5/1994 | Amini et al. | 395/185.06 |
| 5,537,535 | 7/1996 | Maruyama et al. | 395/183.01 |

OTHER PUBLICATIONS

Shinichirou Yamaguchi et al, "High Performance Fault Tolerant Computer Architecture" pp. 23–27.

*Primary Examiner*—Dieu-Minh Le
*Attorney, Agent, or Firm*—Choate, Hall & Stewart

[57] ABSTRACT

A fault-isolating digital data processing apparatus includes plural functional units that are interconnected for point-to-point communications by a plurality of buses. The functional units monitor the buses to which they are attached and signal the other units in the event there are bus communication errors. The functional units can simultaneously enter into an error isolation phase, e.g., in response to a bus error signaled by one of the units. During this phase, each unit transmits test data (e.g., predetermined patterns of 0's and 1's) onto at least one of its attached buses. The functional units continue to monitor the buses and to signal bus errors while the test data is being transmitted. In addition to signaling bus errors, the functional units can signal unit-level (or "board") faults when they detect fault in their own operation. To this end, each unit includes error isolation functionality that signals a fault based on (i) whether that unit signaled a loopback error with respect to its own operation; (ii) whether that unit or another unit signaled a bus error during the error isolation phase; and/or (iii) whether any other functional unit signaled that it was faulty during the error isolation phase.

17 Claims, 17 Drawing Sheets

** virtual index, function code, remote / coherent bits, and byte enables or I/O \*\*fault site number – see section 6.4.3

# DIGITAL DATA PROCESSING METHODS AND APPARATUS FOR FAULT ISOLATION

REFERENCE TO RELATED APPLICATIONS

This application is a continuation in part of U.S. Pat. application Ser. No. 08/309,210, filed Sep. 20, 1994, (now, U.S. Pat. No. 5,630,056) the teachings of which are incorporated herein by reference.

RESERVATION OF COPYRIGHT

The disclosure of this patent document contains material which is subject to copyright protection. The owner thereof has no objection to facsimile reproduction by anyone of the patent document or of the patent disclosure, as it appears in the United States Patent and Trademark Office patent file or records, but otherwise reserves all rights under copyright law.

BACKGROUND OF THE INVENTION

The invention disclosed and claimed herein relates to digital data processing and, more particularly, to methods and apparatus for fault detection and isolation.

A shortcoming of many conventional digital data processors is their inability to detect and isolate a range of data transfer and operational faults. Personal computers and workstations, for example, are typically configured to detect only a single class of data transfer faults, such as, parity errors. When detected, such a fault can cause the computer or workstation to halt operation, or "crash." Larger computer systems often incorporate error-correcting codes to detect and correct single-bit errors. These systems can be equipped to continue operation even in the event of fault.

Computer systems marketed and described in prior patents to the assignee hereof are capable of both detecting, correcting, and continuing operation after faults. U.S. Pat. No. 4,750,177, for example, discloses a fault-tolerant digital data processor having a first functional unit, such as a central processor, with duplicate processing sections coupled to a common system bus for identically processing signals received from other functional units, such as the memory or peripheral device controller. In addition to checking the received data, the first functional unit compares the output generated by the sections while one of them—the so-called "drive" section—transmits processed data to the bus. When the section outputs do not agree, the functional unit drives an error signal onto the bus and takes itself off-line. According to the patent, a functional unit such as a central processor can have a redundant partner that is constructed and operates identically to the original. In such a configuration, if one of the partners is taken off-line due to error, processing continues with the partner.

According to U.S. Pat. No. 4,931,922, also assigned to the assignee hereof, redundant peripheral control units, each with duplicate processing sections, control the latching of data and signaling of errors vis-à-vis data transfers with attached peripheral devices. For this purpose, data signals applied to the peripheral device bus by either the control units or peripheral devices are captured and compared by processing sections within each control unit. The results of those comparisons are shared between the controllers. If the comparisons indicate that the data captured by both control units agrees, then control units generate a "strobe" signal that causes the data to be latched. If the units do not agree after successive retries, the control units withhold issuance of the "strobe" signal and enter an error-handling state for determining the source of the error.

Co-pending, commonly assigned U.S. Pat. application Ser. No. 07/926,857 (now abandoned) discloses, in one aspect, a digital data processing system having dual, redundant processor elements, each including dual, redundant processing sections that operate in lock-step synchronism. Failure detection stages in each section assemble signals generated by that section into first/second and third/fourth groups, respectively. Normally, signals in the first group match those of the third group, while the signals in the second group match those of the fourth group. The groups are routed between the sections along conductor sets separate from the system bus. To detect fault, each stage compares a respective one of the groups with its counterpart. If either stage detects a mismatch, it signals an error to its respective processing section, which can take the corresponding processor element off-line.

While the above-mentioned patents and patent applications describe systems with high degrees of fault detection and fault tolerance, such capabilities are not required for all digital data processing systems. While fault tolerance can be sacrificed in more moderately priced systems, fault detection cannot be. Indeed, in systems that lacking fault tolerance, it is desirable not only to detect fault, but to isolate its source.

An object of this invention, therefore, is to provide digital data processing apparatus and methods with improved fault-detecting capabilities.

A related object is to provide such apparatus and methods with fault isolation capabilities, i.e., that of detecting functional units that are the sources of faults and taking those units off-line.

Further objects of the invention are to provide such apparatus and methods that can be readily implemented without excessive cost.

A related object is to provide such apparatus and methods as can be implemented in high-speed hardware elements, such as ASIC's.

SUMMARY OF THE INVENTION

The aforementioned objects are among those met by the invention, which provides in one aspect fault-isolating digital data processing apparatus including plural functional units that are interconnected for point-to-point communications by a plurality of buses. A system with two central processing units (CPU's) and two input/output (I/O) interface units, for example, can employ six bi-directional buses to couple each unit to the others. The functional units monitor the buses to which they are attached and signal the other units in the event there are bus communication errors. Thus, for example, if one of the functional units detects a parity or error correcting code (ECC) error during the transmission of data, that unit can signal a bus error the other units.

The functional units can simultaneously enter into an error isolation phase, e.g., in response to a bus error signaled by one of the units. During this phase, each unit transmits test data (e.g., predetermined patterns of 0's and 1's) onto at least one of its attached buses. Though more than one unit can transmit test data at a time, only one unit can do so on a given bus. For example, in a system with two CPU's and two I/O interface units, both CPU's can simultaneously drive test data over the buses that couple them to the interface units. Later in the phase, both I/O units can drive test patterns to the CPU's back over those same buses.

The functional units continue to monitor the buses and to signal bus errors while the test data is being transmitted. Each unit does this not only when another is transmitting test data on a common, point-to-point bus, but also when the unit itself is driving such test data. The latter affords each unit the opportunity to perform a loopback comparison to match the data that it intended to drive onto a bus with that actually "received" from the bus through monitoring. For example, in a system as described above, each CPU monitors its buses for error while the I/O units are driving test data and, in addition, while the CPU itself is driving such data. Moreover, each CPU compares the test data that it intended to drive on the bus with that which it receives from the bus.

In addition to signaling bus errors, the functional units can signal unit-level (or "board") faults when they detect fault in their own operation. To this end, each unit includes error isolation functionality that signals a fault based on (i) whether that unit signaled a loopback error with respect to its own operation; (ii) whether that unit or another unit signaled a bus error during the error isolation phase; and/or (iii) whether any other functional unit signaled that it was faulty during the error isolation phase. By way of example, in a system as described above, a CPU can signal the others that it is faulty if it detects a loopback comparison mismatch while driving test data onto the buses. By way of further example, that CPU can signal the others that it is faulty if it and the other functional units detect a bus error during a phase when that CPU drives test data, but not when the I/O units drive test data onto that bus. A unit that determines itself fault can, in addition to signaling the other units, take itself off-line.

According to further aspects of the invention, any of the foregoing functional units can include a processing section that generates data for communication to another unit and that includes dual interfaces for applying that data to the associated buses. The interfaces, referred to as the "drive side" and "check side" interfaces, apply to the buses complimentary portions of each datum generated by the processing section. In the foregoing example, a CPU can use dual interface sections to drive one half of each datum generated by its processing section onto the buses.

The drive side and check side interfaces also receive data driven to the buses, whether by that functional unit or another. With respect to data driven by the functional unit, data received by drive and check sides can be matched against the data intended to be driven by the unit for purposes of the loopback comparison. Thus, for example, portions of a word received from the bus by the check side interface can be compared with the portions which had been applied by that interface as part of a "loopback drive check." Likewise, the other portions of a word received from the bus by the check side interface can be compared against those which had been applied by the other interface (i.e., the drive side interface) as part of a "loopback compare check."

Still further aspects of the invention provide methods for fault-isolating digital data processor operation paralleling the processes described above.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
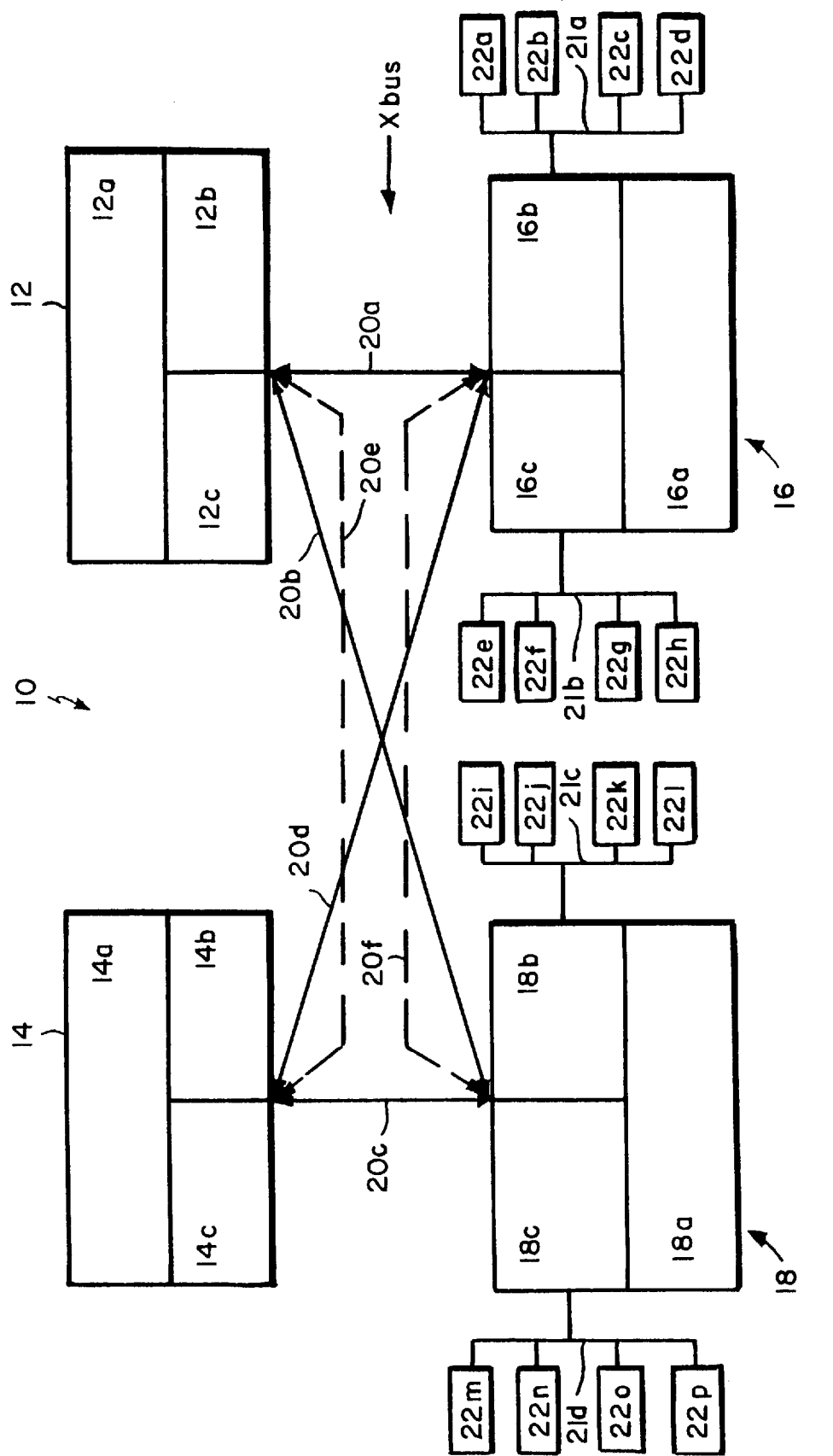
FIG. 1 depicts a digital data processing system employing the invention.

FIG. 1 depicts a digital data processing system 10 according to one practice of the invention. The system 10 includes multiple functional units, namely, central processing unit (CPU) 12, CPU 14, input/output (I/O) unit 16 and I/O unit 18. Each CPU 12, 14 is coupled to each I/O unit 16, 18 via buses 20A–20D, as illustrated. These buses can include data lines, as well as control lines. CPU 12 is also coupled to CPU 14 via bus 20E, while I/O unit 16 is coupled to I/O unit 18 via bus 20F. These buses include control lines, although they can also include data lines. Each functional unit includes a processing section, 12A, 14A, 16A, 18A, respectively, and two interface sections 12B, 12C, 14B, 14C, 16B, 16C, 18B, 18C, respectively, as shown in the drawing. In a preferred embodiment, each functional unit is contained on a printed circuit board that couples to a bus backplane in the system cabinet (not shown) in the conventional manner.

The processing sections 12A, 14A carry out conventional functions associated with central processing units, e.g., instruction execution. To this end, the processing sections 12A, 14A can include conventional microprocessors or other central execution units (not shown), as well as other conventional elements (e.g., on-board memory) typically employed for those functions. Interface sections 12B, 12C (constituting the drive side and check side interfaces for unit 12) transfer information between associated processing section 12A and buses 20A, 20B, 20E which couple CPU 12 with I/O units 16, 18 and with CPU 14. Likewise, interface sections 14B, 14C (constituting the drive side and check side interfaces for unit 14) transfer information between processing section 14A and buses 20C, 20D, 20E which couple CPU 14 to those same I/O units 16, 18, and to CPU 12.

I/O units 16, 18 serve as bridges to peripheral device buses 21A–21D and, in turn, to peripheral devices 22A–22D, as illustrated. In the illustrated embodiment, peripheral device buses 21A–21D operate in accord with the industry standard PCI Bus Specification. Peripheral devices 22A–22P are also PCI compatible. I/O units 16, 18 can include processing sections 16A, 18A, respectively, for carrying out administrative tasks, if any, required by the I/O units in their roles as PCI bridges. Interface sections 16B, 16C (constituting the drive and check sides of unit 16) and, 18B, 18C (constituting the drive and check sides of unit 18) provided in each of the I/O units 16, 18, respectively, transfer information between buses 20A–20D and buses 21A–21D. This includes converting transferred information to and from the PCI protocol used by buses 21A–21D. Although each pair of interface sections 16B, 16C and 18B, 18C interface with a respective pair of internal buses 20A, 20D and 20B, 20C, respectively, the sections 16B, 16C, 18B, 18C interface dedicated PCI buses 21A, 21B, 21C, 21D, respectively, as illustrated.

Though the illustrated I/O units 16, 18 serve as PCI bridges, those skilled in the art will appreciate that the invention has application to I/O units capable of interfacing and/or controlling peripherals that communicate via any protocol. More generally, it will be appreciated that, although the illustrated functional units are central processing units and I/O units, the invention can be applied to any class of functional units, e.g., central processing units, memory units, I/O units, communications units, etc.

In operation, the CPU's 12, 14 drive information to I/O units 16, 18 over their respective buses 28A–20D, and vice versa. Each of the units 12–18 also monitor the buses to which they are attached and signal the other units in the event that there are bus communication errors. Thus, for example, if CPU 12 detects a parity error or an error correcting code (ECC) error during a transmission of data to I/O units 16, 18 over data lines in buses 20A, 20B, respectively, CPU 12 can signal that bus error to the I/O units over control lines in buses 20A, 20B. CPU 12 can also signal a bus error to CPU 14 over bus 20E. The other functional units 14–18 can likewise signal bus errors in the event they detect erroneous transmissions over their respective buses.

In response to a bus error signal by any of the functional units 12–18, each functional unit enters into an error isolation phase. During this phase, each of the units 12–18 transmits patterns of test data onto its respective buses 20A–20F while, at the same time, monitoring those buses for error. For example, in response to a bus error signaled by I/O unit 18, CPU 12 can drive test patterns onto buses 20A, 20B, while CPU 14 simultaneously transmits test patterns on buses 20C, 20D. During these transmissions, each of the functional units 12–18 monitor the buses 20A–20D for parity and ECC errors, while CPU's 12, 14 perform loopback checking on their respective buses 20A, 20B and 20C, 20D, respectively. Once the CPU's 12, 14 have completed their test cycles, I/O units 16, 18 take their turns at driving test data onto the buses.

The functional units continue to monitor their respective buses 20A–20D and to signal bus errors while the test data is being transmitted. Each unit 12–18 does this not only when another unit is transmitting data on a common bus, but also when the unit itself is driving such data. This permits the units to perform loopback comparisons to match the data that it intended to drive onto a bus with that actually received from the bus through monitoring. For example, while CPU 12 is driving test data onto buses 20A, 20B, it simultaneously compares data values received from those buses to ensure that they are identical with the driven data. As during normal operation, the functional units 12–18 signal bus errors to one another in the event that they detect communications faults during the error isolation phase.

In addition to signaling bus errors, each of the functional bus errors 12–18 can generate a default (or "broken") if it detects that its own operation is faulty. Thus, whenever a functional unit 12–18 detects a loopback error, it will signal the others that it is broken. Furthermore, if any of the units 12–18 detect a bus error when it drives test data onto the bus, but not when another unit drives such data, the unit can signal the others that it is broken—so long as none of the other units has, first, signaled broken, e.g., as a result of its own loopback error. By way of example, CPU 12 will signal the other functional units 14–18 that it is broken if CPU 12 detects a bus error during a cycle when it is driving test data onto buses 20A, 20B, but not when I/O units 16–18 are driving test data onto those buses. On detecting that it is faulty, any of the functional units 12–18 can take itself of-line.

A more complete understanding of the construction and operation of the illustrated embodiment may be attained by reference to the section that follows, in which digital data processing system 10 is referred to as "Polo," buses 20A–20F are referred to as the "Xbus," buses 21A–21D are referred to as the "Ibuses," CPU 12 is referred to as "CPU1," CPU 14 is referred to as "CPU0," I/O unit 16 is referred to as "PCI Bridge 1" or "PCIB 1," I/O unit 18 is referred to as "PCI Bridge 0" or "PCIB 0."

Bus Naming Convention

The Xbus actually consists of 4 data buses and 12 control buses, which are named as described below.

Data Bus Naming Convention

Figure 2:
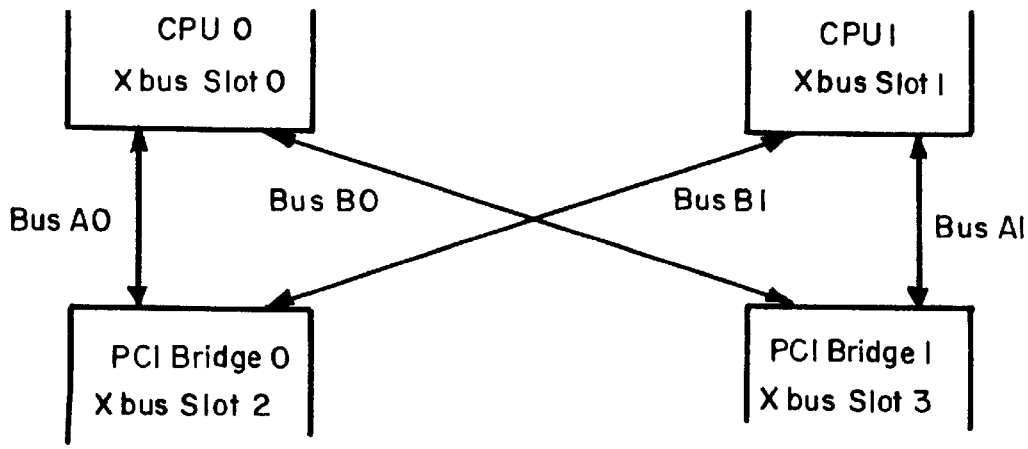
FIG. 2 depicts the data buses of an "Xbus" according to the invention.

FIG. 2 shows a block diagram of the 4 data buses in the Xbus system. The number for the bus is taken from the CPU slot number shown in the illustration; therefore data buses connected to CPU 0 end in 0 and data buses connected to CPU 1 end in 1. The letter for the bus is determined by whether or not the bus is a crisscross bus (i.e. connects an even slot number to an odd slot number) or a straight bus (i.e. connects an even to an even or an odd to an odd slot). Based on this convention, CPU 0 has connections to data bus A0 and B0. CPU 1 has connections to data bus B1 and A1. PCI Bridge 0 has connections to data bus A0 and B1. PCI Bridge 1 has connections to B0 and A1. In the illustrated embodiment, the PCI bridge cards do not run in lock-step.

Control Bus Naming Convention

Figure 3:
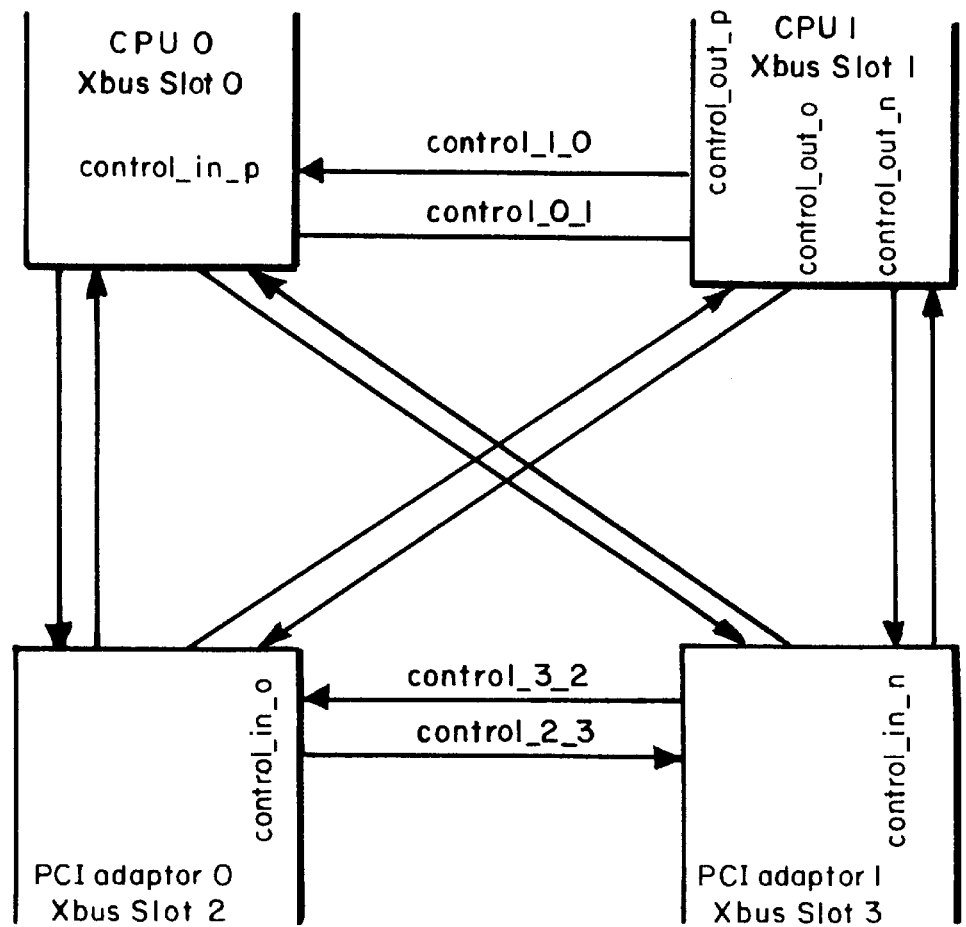
FIG. 3 depicts the control buses of an Xbus.

FIG. 3 shows a block diagram of the control buses in the Xbus system. The control naming convention for the backplane signals uses the signal name followed by the source of the signal and then the destination of the signal. The naming convention for the associated ASIC pins uses the signal name, the direction (in or out), and the connection (n for neighbor, o for opposite, and p for peer). Examples of this naming convention are shown in FIG. 3. Table 1 lists the names of all control buses in the Xbus.

TABLE 1

Control Bus Names

| Control Bus Source | Control Bus Destination | Control Bus Name | ASIC Driving Pin Name | ASIC Receiving Pin Name |
|---|---|---|---|---|
| CPU 0 | CPU 1  | control_0_1 | control_out_p | control_in_p |
| CPU 0 | PCIB 0 | control_0_2 | control_out_n | control_in_n |
| CPU 0 | PCIB 1 | control_0_3 | control_out_o | control_in_o |
| CPU 1 | CPU 0  | control_1_0 | control_out_p | control_in_p |
| CPU 1 | PCIB 0 | control_1_2 | control_out_o | control_in_o |
| CPU 1 | PCIB 1 | control_1_3 | control_out_n | control_in_n |
| PCIB 0 | CPU 0 | control_2_0 | control_out_n | control_in_n |
| PCIB 0 | CPU 1 | control_2_1 | control_out_o | control_in_o |
| PCIB 0 | PCIB 1 | control_2_3 | control_out_p | control_in_p |
| PCIB 1 | CPU 0 | control_3_0 | control_out_o | control_in_o |
| PCIB 1 | CPU 1 | control_3_1 | control_out_n | control_in_n |
| PCIB 1 | PCIB 0 | control_3_2 | control_out_p | control_in_p |

Bit Numbering

Figure 4:
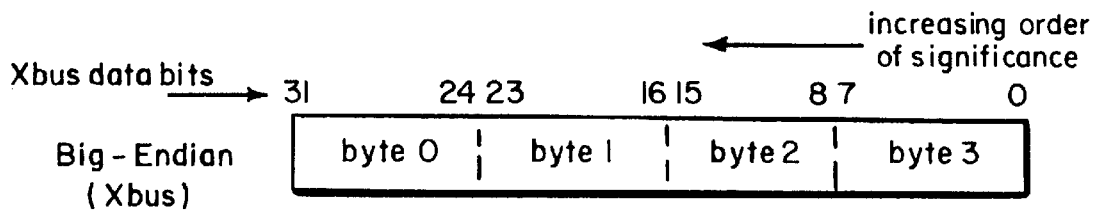
FIG. 4 depicts a bit numbering scheme for an Xbus.

FIG. 4 shows a description of the bit numbering scheme used on the Xbus.

Terminology bus cycle—the 24MHz (~41.67 ns) building block from which all Xbus operations are built. A bus cycle is the time which a valid logic level driven by one board on the backplane is seen by all other boards. Two bus cycles compose a bus phase, 4 bus phases compose a bus operation, and one or more bus operations compose a bus transaction.

bus phase—the 12MHz (~83.3ns, 2 bus cycle) building block from which all bus operations are constructed. There are logically 11 types of bus phases on the Xbus; "Arb", "Info", "Post1", and "Post2" are the phases that occur during normal operation. When an error is detected, the special phases "Error1", "CPU test", "CPU Post", "IO Test", "IO Post1", "IO Post2", and "Error2" are inserted in the protocol for fault isolation. (The error phases are sometimes collectively referred to as "Post3"). During each bus phase it is possible to transmit two sets of information on a physical set of backplane lines (i.e. "double pumping") though this is not done for all bus phases and/or signals.

bus operation—A bus operation is the basic unit of address and data transmission and checking on the Xbus. It is generally composed of at least 4 phases: an Arb phase followed by Info, Post1 and Post2 phases. Bus errors cause the insertion of the error phases after Post2 and increase the number of phases required to complete a bus operation. Bus operations may consist of multiple info transmissions in the case of a block transfer. A bus operation can be thought of as a full one way transfer on the Xbus.

bus sub-operation—A bus sub-operation is an operation initiated by a bus master during subsequent phases of a block transfer. Sub-operations always carry data and BUSYs are ignored. It is generally composed of 4 phases: an Arb phase during which grant inhibit is used, followed by Info, Post1 and Post2 phases. Bus errors may increase the number of phases required to complete a bus sub-operation. A sub-operation is differentiated from an operation in that a bus operation for a block transfer consists of the first transfer plus a number of sub-operations consisting of multiple data transfers.

bus transaction—a complete high level exchange of information on the Xbus. Examples include reads and writes. A read transaction between CPU and PCIB is composed of a minimum of two bus operations; one operation provides the address and function code, and one or more operations provide the return data. A write transaction to a PCIB is composed of a minimum of two operations; one operation provides address and function code, and one or more additional operations provide the data.

Figure 6:
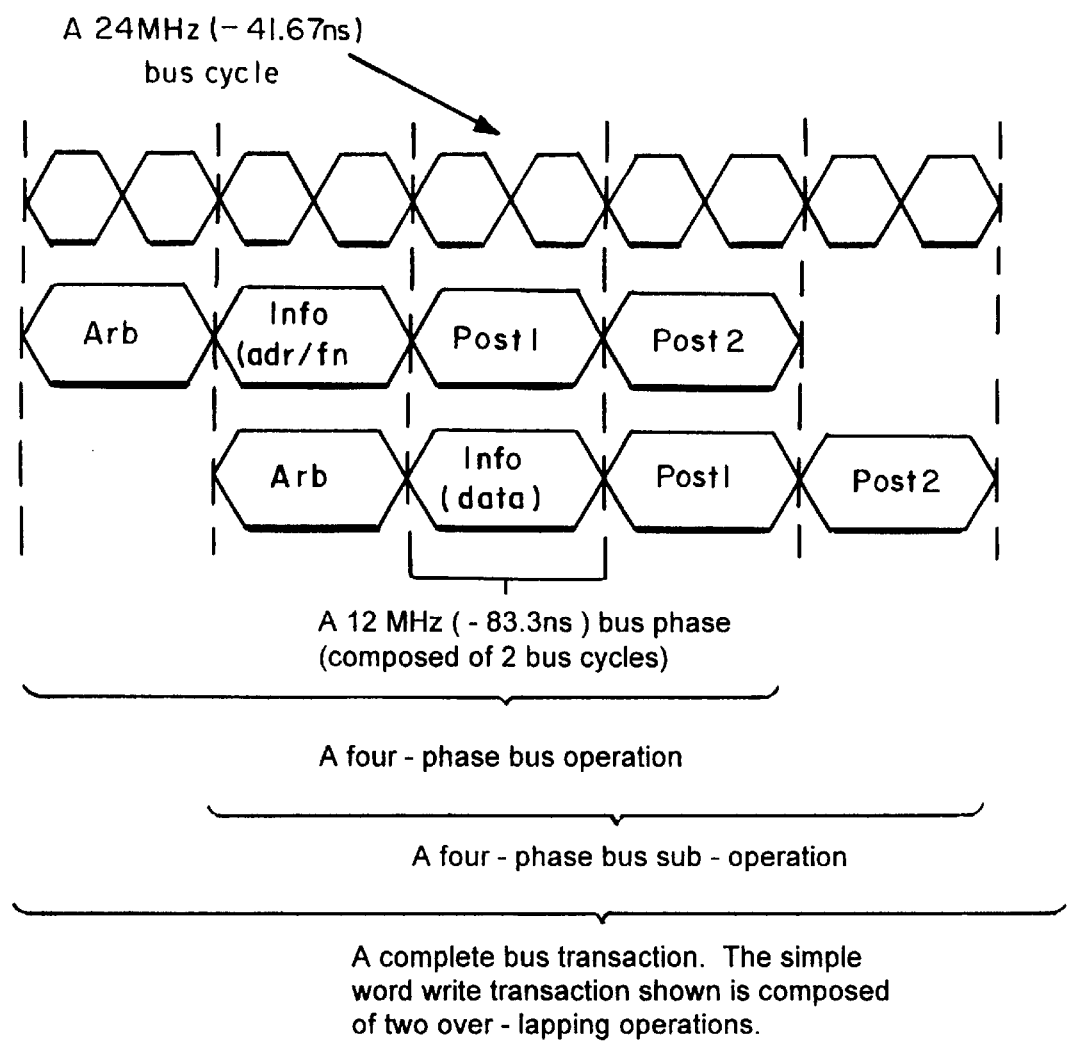
FIGS. 5 and 6 illustrate simple word, read and line write transactions on an Xbus.
Figure 5:
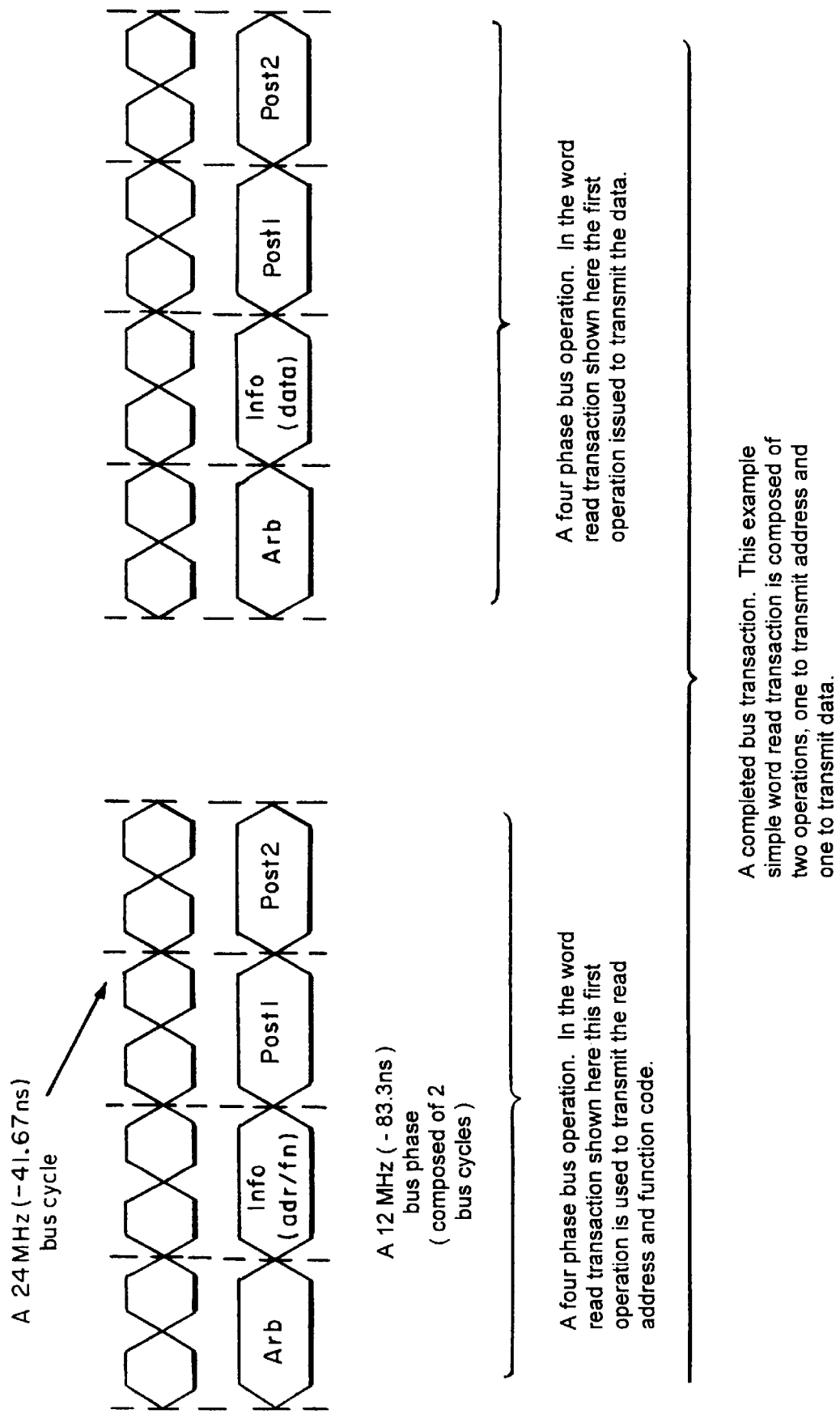

FIGS. 5 and 6 illustrate the terminology surrounding simple word read and line write transactions.

Bus Master—A board that has won arbitration. This board drives the info lines in the info phase of the bus operation. A bus master can be a transaction master or a transaction slave.

Bus Slave—A board that has determined the info lines carry information that it must receive. A bus slave can be a transaction master or a transaction slave.

CD different read—A read in which the C and D side ASICs each provide half the data e.g. when reading error status registers. Loopback checking of the bytes driven by the other side is suppressed.

Cyclops—The Xbus to Ibus interface ASIC on the CPU board in the Polo system.

echo transaction—The second half of a peer-to-peer bus transaction between CPUs. Send and echo transactions are not split; grant inhibit is used to ensure that no other transactions occur between the send and echo. This is to prevent re-ordering.

EFQ—Eviction-Flush Queue. This queue exists only on CPU boards. Refer to the Cyclops (Bus Interface) Specification for details.

EFQ-Freeze State—Set via bit 19 of the Bus Interface State Register. This mode only exists on CPU boards. When in this mode, a board will busy all accesses directed to its EFQ except those from its partner unless it is a data return of any size.

Fast Duplexing—Fast duplexing is a form of duplexing in which no memory is updated. This is done when both boards are coming up for the first time as opposed to updating a new board from a running OS.

Freeze-State—Set via bit 14 of the Bus Interface State Register. This mode only exists on boards that can be duplexed. When in this mode, a board will busy all accesses directed to its RWQ except those from its partner.

Gambit—The Xbus to PCI ASIC on the PCI Bridge card. It interfaces to the Xbus and the PCI bus.

I/O virtual address (IOVA)—An IOVA is an address generated by a PCI card. This address is transmitted across the Xbus to the Cyclops ASIC. Inside the cyclops ASIC, the address is translated into a valid system address. The IOVA is used to provide fault tolerance. It guarantees that a PCI card will generate a correct address range.

loopback checking—This is when an ASIC checks that the value it sees on a pin is equal to the value it thinks should be on the pin during normal operation.

loopcheck operation—This is when the bus ASICs drive test patterns of 55/AAs as part of the error protocol in order to determine the site of a fault.

peer to peer transaction—A two part transaction between two CPUs. The Xbus does not have fully interconnected data buses, and transfers between the two CPU boards must occur in two steps: first a send between the CPU and the PCIBs), then an echo from the PCIB(s) to all of the CPU(s). The requesting CPU drives a complete transaction on its A and B buses. The PCIBs look at the address, and determines whether the transaction is directed to the CPUs. If it is, they buffer the transaction in order to repeat the transaction on their A & B buses once Post2 of the last info phase has passed with no bus errors. In this way, both CPUs see the transaction at the same time. Peer to peer transactions between CPU boards require a minimum of four operations.

RWQ—Read/Write Queue. This queue exists only on CPU boards. Refer to the Cyclops (Bus Interface) Specification for details.

Regurgitated Info—A regurgitated info is a Cougar [Conrad, what is Cougar?] generated cycle used during the update process. It is generated by the update-on-line board and transmitted to the update off-line board. It is unique because an update off-line board accepts info cycles even if the base address does not match the base address of the board.

send transaction—The first half of a peer-to-peer bus transaction between CPUs.

single side operation—An operation with data supplied entirely by either the C or D ASIC; e.g. a read from a PCI card. Loopback checking is performed only by the side supplying the data.

TRID—Transaction identifier. This is a unique binary number used to tie together two bus operations during a split transaction and to identify the source for write transactions (TRIDs on write transactions are strictly for debug). A TRID is unique only while a given transaction is still outstanding and will be re-used for later transactions by a transaction-master. Note that trid bits 02–00 are used for the slot number of the transaction-master and trid bits 06–04 are generated by an on-board master—thus allowing a board to have 8 unique masters with transactions outstanding. Trid bit 03 is a new bit for Polo that indicates the format of the address; a zero indicates a Jetta style system address is being transmitted and a one indicates an IOVA (I/O Virtual Address) format is on the backplane. The IOVA address needs to be translated into a system address via the map RAM.

Transaction Master—The specific resource on a board that generated a transaction. The transaction master is responsible for generating the TRID of the transaction.

Transaction Slave—The board on which a transaction was directed towards, i.e. a board in which the function code and address of a bus operation has decoded to.

Xbus Signal Description

The following section describes in detail the various signals that comprise the Xbus. A functional description is included for each type of signal, though not for every individual signal (for example: there is a TRID field for all 4 buses, however there is only one description that covers both). The following rules were used in creating the signal names:

all lower-case characters the "_" is a delimiter when it is not at the end of a signal name the "_" at the end of the signal name indicates that the signal is low-true _a indicates A_bus signals _b indicates B_bus signals _x_, _y_, and _z_ are used for the three low-true signals on a triplicated net

[n:m] is used to describe a multi-bit field

Signal Description

The bused signals are implemented as four point-to-point bi-directional signals. The ability to drive these signals is controlled through an arbitration network. These signals are protected by a single parity bit that accompanies the bus. The buses are interconnected so that each CPU is connected to both PCI bridge boards and each PCI bridge board is connected to both CPUs. Error recovery is accomplished through the XBus error protocol.

The control signals are organized in a set of point to point unidirectional buses. Each of these buses is ECC protected. These buses carry control signals which are not governed through arbitration. Unlike the bused signals, there is a control bus in each direction between every board. This is necessary in order to ensure the single bus view of the system. For example, if one PCI bridge card sees a bus error, that information must be transmitted to all three other boards in order for the boards to all perform the error sequence.

The bused signals and control signals are double pumped at 24MHz each cycle. That is, they carry different data during the first and second 24Mhz bus cycles that make up a single phase. All buses and control signals are active high on the backplane.

A small number of reset and broken related control signals are buffered by the 26S10 transceiver and replicated for three way voting. These signals are active low on the backplane.

The Info Bus

The following signals are collectively referred to as the info bus. Although there are actually 4 sets of these signals (a0,a1,b0,b1), for simplicity's sake only the a0 version is listed. For example, when the TRID field is described, it should be understood that there are actually 4 TRID buses: trid_a0, trid_b0, trid_a1, and trid_b1.

TABLE 2

Xbus Bidirectional Buses

| signal | width | description |
|---|---|---|
| info_a0[31:0] | 128 (32 × 4) | Xbus info bus - Info is driven during the info phase of a bus operation by the current bus master. This field may contain either an address (physical address or virtual index with function code) or data, depending on the fund_op control line. |
| trid_a0[6:0] | 28 (7 × 4) | Xbus transaction is (TRID) - The trid lines carry the TRID (transaction ID) during the first cycle of a phase. During the second cycle, it carries the number of phases remaining, the first_op bit, and cache coherency bits. |
| func_op_a0_ | 1 | Xbus func_op - This line carries the func_op_ signal which indicates that the current information on the info bus contains a function code that should be decoded. This signal is low true so that an idle bus will indicate that a function needs to be decoded, and thus a no-op function. This bit is valid during an info phase and is protected by parity along with the lower half of the info field. During the second cycle, it is unused (driven to logic 0 on the backplane). |
| parity_a0 | 1 | Xbus parity - This parity signal covers all of the bidirectional signals on a bus; info, trid, func_op_. |
| TOTAL | 158 | |

The Control Bus

This section describes the control signals. There are actually 12 control buses, but again only one is described here. The names of the twelve control buses are listed in Table 1, above. For simplicity of documentation, the control bus is identified by bit numbering, similar to the trid field. However, since the meaning of the control bus bits is very significant, each one is described in detail here.

The control buses are protected by a single bit correction, double bit detection ECC code.

TABLE 3

Control Bus Signals

| signal | width | description |
|---|---|---|
| control[0] | 12 (12 × 1) | bus_req and ack - During the first half of the phase, this bit is used for bus_req. During the second half of the phase, this bit is used for ack. During the first half of the phase, this bit is driven by a board when it is requesting the bus. As described in later sections, the bus uses a distributed arbitration model loosely based on the Golfbus. Each board in the system drives the bus_req and tests all of other boards bus_req signals to determine who will drive the info signals during the next phase. During the second cycle of the phase, this bit is used to acknowledge a bus transaction. Ack is asserted in Post2 by the target board of the transaction. This signal is the result of an address decode, so it is only valid in Post2 of an operation that is transferring an address. Ack provides an indication of whether or not a transaction is progressing. This is relevant in a Polo system, since a PCI card may go away resulting in a no ack for a ping operation. Acks in Polo system also let a PCI Bridge know that a CPU's map RAM has mapped a PCI initiated access to a valid CPU address. If a PCIB's read or write is not Aed, the PCI slot that initiated the access may or may not be set off-line depending on bits in the Gambit's configuration register. Writes from the CPU to the PCIB are acked to facilitate debug, but are otherwise unused. A peer to peer CPU write is not ACKed by the PCIBs, but the echoed operation is |
| control[1] | 12 (12 × 1) | grant_inh and main_int - During the first half of the phase, this bit is used for grant_inh, during the second half of the phase, this bit is used for main_int. During the first cycle, the grant inhibit control bit is driven by the current bus master to extend the info cycles when the bus master is moving a block of data. The arbitration logic will not issue a grant to any other board when a board is driving the signal. This ensures that the current bus master will retain ownership of the bus for another cycle. During the second half of the cycle, this bit is used to signal a maintenance interrupt. Maintenance Interrupt indicates that some board in the system is requesting attention from the software maintenance process. Any board in the system may drive this signal during the second half of a bus phase regardless of bus mastership. All boards in the system will sample maintenance interrupt and use it to reset their arbitration priority. |
| control[2] | 12 (12 × 1) | bus_err_a and busy - Assertion of this signal during the first half of Post2 signals that a bus error was detected on the info bus associated with this particular control bus (n, o, p). Any operation in Arb, Info, or Post1 will be aborted. Operations in Post2 are suspended while the error protocol runs, and then will return to the Info phase. The CPU initiator of a peer-to-peer operation must track the entire operation to see whether |

TABLE 3-continued

Control Bus Signals

| signal | width | description |
|---|---|---|
| | | the cycle is errored in either the send or echo portion of the transaction. Assertion of this signal during the second half of Post2 indicates to the bus master that the operation should be aborted and re-tried at a later time. Busy is ignored for the send portion of a peer-to-peer operation. The CPU initiator of a peer-to-peer operation must track the entire operation to see whether the cycle is busied. |
| control[3] | 12 (12 × 1) | bus_err_b and funny_state - Assertion of this signal during the first half of Post2 signals that a bus error was detected on the B bus connected to this board. Any operation in Arb, Info, or Post1 will be aborted. Operations in Post2 are suspended while the error protocol runs, and then will return to the Info phase. The CPU initiator of a peer-to-peer operation must track the entire operation to see whether the cycle is errored in either the send or echo portion of the transaction. During the second half of the cycle, this bit is used to signal that a board has just gone unbroken. The board will continue to assert this signal until it has seen eight phases without a bus error occurring. At that point the board will stop asserting this signal. Then all other boards will treat this board as an active, responding board. This prevents a board that is going unbroken from responding to bus errors in the middle of an error sequence that is already underway. |
| control[7:4] | 48 (12 × 4) | checkbits - The top 4 bits of the control bus are checkbits generated from the lower 4 bits of control signals. The Checkbit algorithm is: control[4] = control[0]^control[1]^control[2]; control[5] = control[0]^control[1]^control[3]; control[6] = control[0]^control[2]^control[3]; control[7] = control[1]^control[2]^control[3]; |
| TOTAL | 108 | |

The Voted Signals

The voted signals are the only signals through 26S10 transceivers. These signals are point to point and terminated at each end, so that insertion of an unpowered board does not disturb the termination (and the termination (and timing) of a net in use. Only the __x__ versions are listed; there are __y__ and __z__ signals making up the triplet.

TABLE 4

3-Way Voted Signals

| signal | total | description |
|---|---|---|
| reset_0_1_x_, reset_0_2_x_, reset_0_3_x_, reset_1_0_x_, reset_1_2_x_, reset_1_3_x_, | 18 (2 × 3 × 3) | reset - There are separate 3-way voted triplets from each CPU to the other three boards in the system. When a RECC needs to reset the system all lines go active. When a CPU wants to reset another board, only the lines going to that board are active. |
| board_not_broken_0_1_x board_not_broken_0_2_x board_not_broken_0_3_x board_not_broken_1_0_x board_not_broken_1_2_x board_not_broken_1_3_x | 36 (4 × 3 × 3) | broken status - This three way voted signal is driven from each board to each other board. It is driven when a board is alive and not broken |

TABLE 4-continued

3-Way Voted Signals

| signal | total | description |
|---|---|---|
| board_not_broken_2_0_x | | in the system and is used |
| board_not_broken_2_1_x | | to determine which buses |
| board_not_broken_2_3_x | | are active. The C-side |
| board_not_broken_3_0_x | | ASICs drive the signals |
| board_not_broken_3_1_x | | and the D-side ASICs |
| board_not_broken_3_2_x | | drive the output enables for the 26S10s. This organization guarantees that board_not_broken is deasserted whenever either side of the board thinks that the board is broken. The receiving board votes the x, y, and z signals. CPU0 in slot0 drives board_not_broken[0], etc. |
| sync_x_ | 3 (1 × 3) | sync status - These signals are on the CPU only and are used when synchronizing a pair of CPUs to enter the duplexed state. |
| even_online_x_, odd_online_x_ | 6 (2 × 3) | on-line status - These signals are on the CPU only and are used by the CPU boards to communicate to each other which CPU board(s) are in the on-line state. Even_online_ is asserted when the CPU in slot 0 is on-line; odd_online_ is asserted when CPU in slot 1 is on-line. |
| TOTAL | 63 | |

Other Control Signals

TABLE 5

Miscellaneous Control Signals

| lot_ida | 2 | slot id - The slot ID signals are hard wired on the |
| slot_idb | | backplane for each slot. There is one duplicated slot id. Since the slots are dedicated in Polo, it is only necessary to determine if a board is in an even or an odd slot. These two bits will be registered and checked by each ASIC at reset and will not be sampled again. If an error is detected at reset, the board will break and hence will never be capable of being brought on-line. |
| xb_clk8 | 1 | system clock - This is the system clock received by the Sentry clock chip and used to generate the board clocks. It is generated by the backplane clock oscillator. This clock runs at 8 MHz, so every board in the system will be in sync with each other and there will be no need for additional syncronization clocks to be passed along the backplane. The clock is pulse width modulated so that 4 MHz can be generated. |
| slot0_ta_d, slot0_ta_c_, slot1_ta_d, slot1_ta_c_ | 4 | ta signals - These "ta" signals are only present on CPU boards and are sent between a duplexed board pair for early detection of the boards going out of lockstep. |
| TOTAL | 7 | |

Xbus Protocol

Overview

The Xbus is a point-to-point synchronous, pipelined, multiplexed address/data, error detecting bus with split-transaction capabilities. Function-code, address and data are parity and loop-back checked. Control lines are ECC protected and loop-back checked. Three-way voting is implemented on the reset, clock, and broken indicator lines.

The bus supports word accesses and has a block transfer capability for support of cache line accesses. The Xbus has a logical 32-bit wide data/address bus.

Bus Operation

Figure 7:
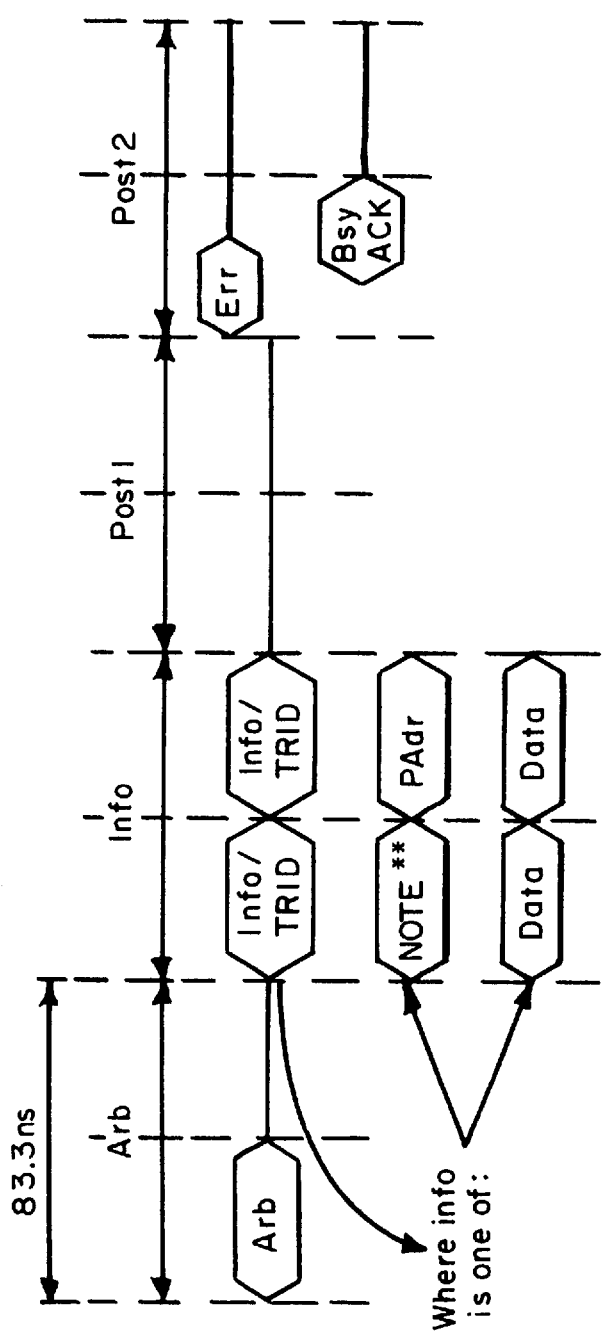
FIG. 7 depicts the phases of an operation on an Xbus.

The basic component of all Xbus transactions is the operation. An operation is composed of four phases as illustrated in FIG. 7: arb, info, post1, and post2. Two information transfers can occur on the bus during each phase; this is referred to as "double pumping". The double pump frequency is approximately 24MHz. The figure illustrates the logical activity on the bus. All information is directly registered in the ASICs without any external buffers.

The phases are used as follows:

Aarb phase: Boards drive their arbitration request lines during the first half (cycle) of the arbitration phase. During the second half they determine whether they won arbitration and prepare for the info phase.

Info phase: For non-IOVA address transfers, boards drive the virtual index, function code, remote/coherent bits, and byte enables during the first half of the info phase and the physical address during the second half. For IOVA address transfers (IOVA bit in the trid is true), boards drive the IOVA during the first half of the info phase and deterministic data with good parity during the second half; the physical address is gotten from the I/O address map RAM look-up. For data transfers, data is driven during both the first and second halves of the cycle. Note that non-cache consistent address transfers need not supply a virtual index through the driven information must be deterministic and parity will be computed across it.

Post1 phase: During this phase, boards are determining whether any error conditions existed with the info phase and whether there is need to BUSY the operation. CPU boards map the device index portion of the IOVA to obtain the full physical address and virtual index of an I/O board's transfer for IOVA address transfers.

Post2 phase: Any board detecting an error with the info phase drives the error lines during the first half. If a board does get error, it next goes to the error sequence phases to determine the source of the error. Any board detecting the need to BUSY an address/function code driven during the info phase drives BUSY during the second cycle of this phase. It is also during this phase that accesses are acknowledged.

Bus Busies

Figure 8:
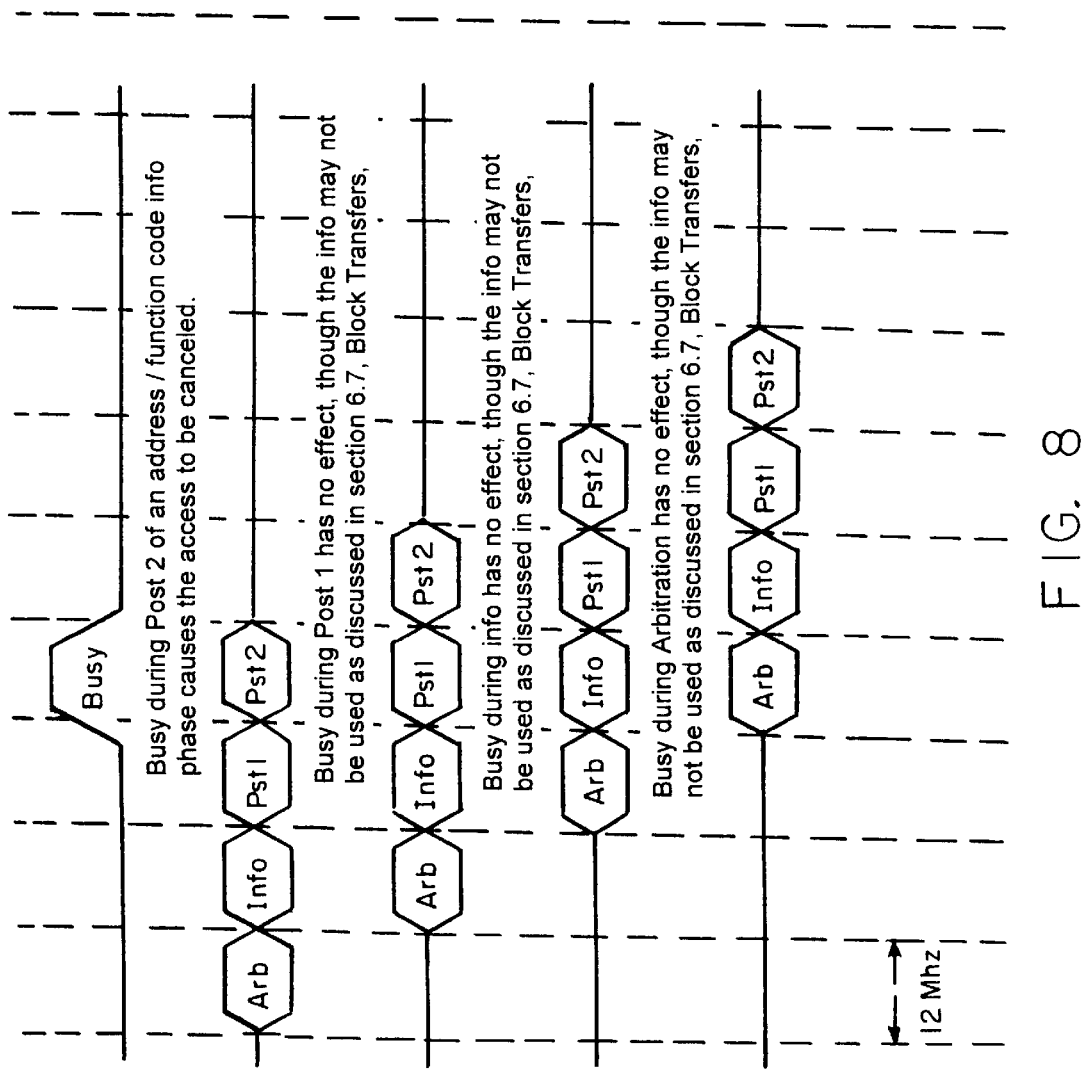
FIG. 8 depicts the effect of bus BUSYs on the basic bus cycle of an Xbus.

FIG. 8 illustrates the effect of bus BUSYs on the basic bus cycle. As shown in the figure, BUSY has no effect on a bus operation during any phase except for post2; a BUSY during post2 will cancel the bus operation. Note that busys for multiple cycle bus operations, such as block transfers, have the special rules. Should a cycle be both BUSYed and error, the ERROR takes precedence.

Bus Errors

Figure 9:
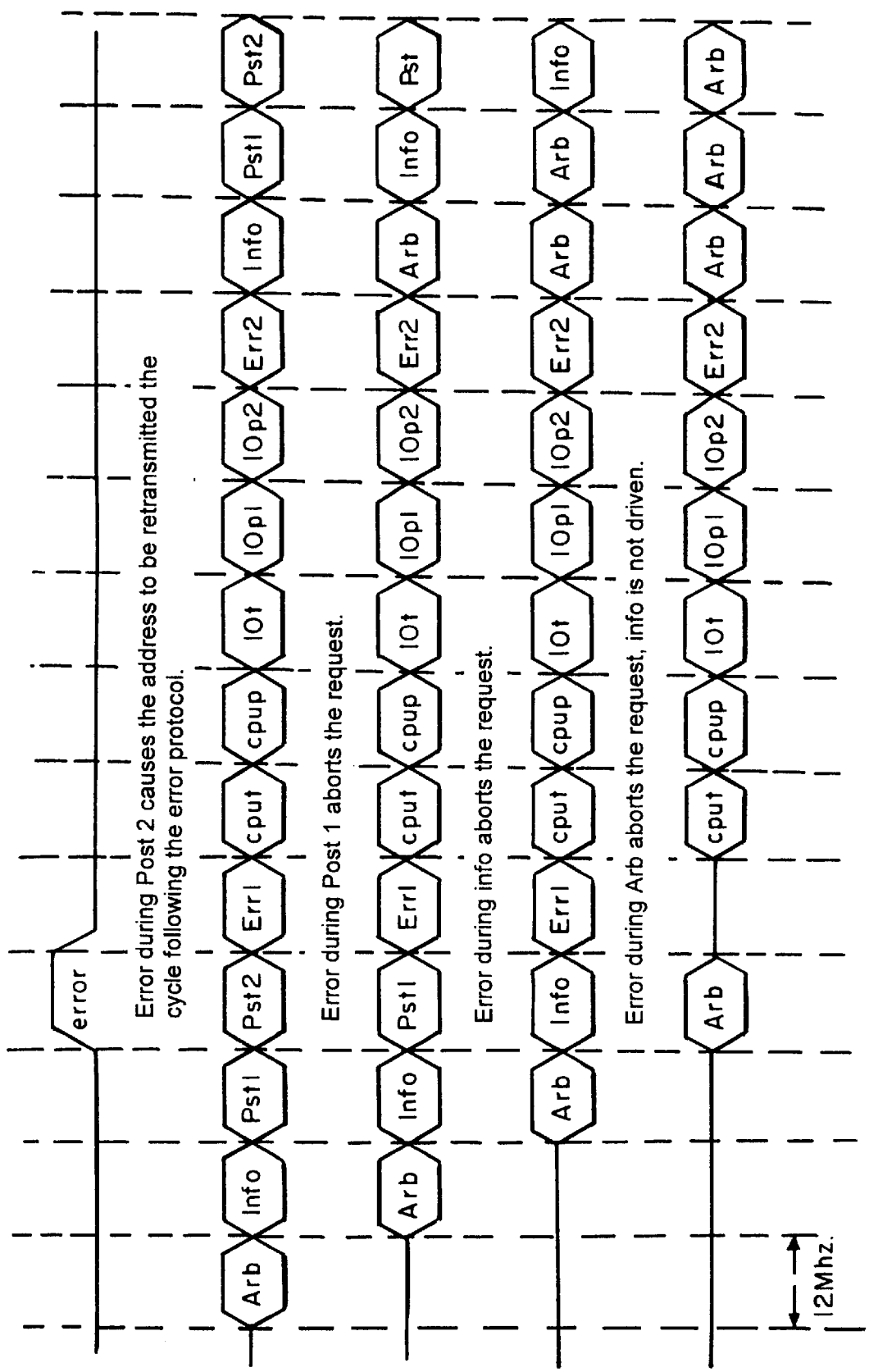
FIG. 9 depicts the effect of bus errors on an Xbus.

FIG. 9 shows the effect of bus errors on the basic bus cycle. As shown in that figure, the board that was transmitting during the error automatically gets the first available info cycle following execution of the error protocol. The arbitration is ignored in the previous cycle.

Since the Xbus has no transceivers, the loopcheck phase of the Golfbus error protocol (Post4) has been modified to allow each board an opportunity to verify its transmit and receive capabilities. This has resulted in new states being added to the bus error operation. These states are described below:

Err1: The Err1 state is entered on the cycle after a bus error is detected. This state is used to allow for time to turn off the info bus before the loopback checks are performed. A board that is in its info phase during Err1 will disable its output enables half way through the phase.

CPUTest: The CPUTest state is used to test the CPU's ability to drive patterns on the Xbus. On the first cycle of the phase the CPU will drive 55 on the info bus, 55 on the trid bus, 1 on the parity line and 0 on the $func_{13}$ op line. On the second cycle of the phase the CPU will drive AA on the info bus, 2A on the trid bus, 0 on the parity line and 1 on the func_op line.

CPUPost: The CPUPost state is used to turn the bus around between the CPU's loopback check and the I/O boards loopback check. This phase is also used as a Post1 cycle for the CPU's loopback pattern.

IOTest: The IOTest state is used to test the I/O board's ability to drive patterns on the Xbus. On the first cycle of the phase the I/O board will drive 55 on the info bus, 55 on the trid bus, 1 one the parity line and 0 on the func-op line. On the second cycle of the phase the I/O board will drive AA on the info bus, 2A on the trid bus, 0 on the parity line and 1 on the func_op line. Bus errors from the CPUTest phase are reported during this phase. This information is used to evaluate the bus, CPU, and I/O board at the end of the error sequence. The last I/O ASIC to drive the data bus drives the bus during the IOTest phase.

IOPost: The 1OPost1 state is used to evaluate the IOTest data.

IOPost: The IOPost2 state is used to transmit any bus errors from the IOPost1 state. This information will be used to make an intelligent decision about how to deal with the error.

Err2: The Err2 state is used to evaluate the information from the loopback checks. Bus errors from CPUPost and IOPost2 as well as information shared between the C and D sides of each board are used to determine what course of action to take. This set of actions will be described later in this section.

Figure 10:
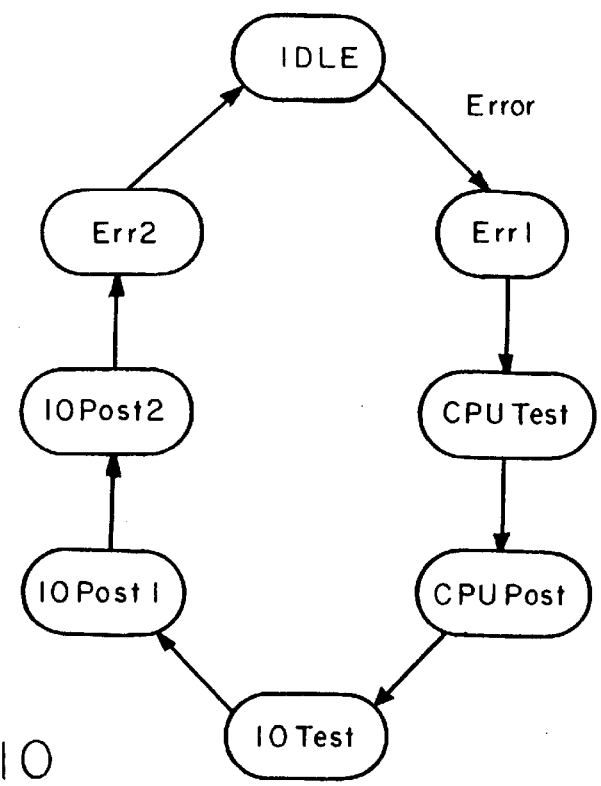
FIG. 10 depicts the basic state machine and state transitions for a bus handler used in connection with an Xbus.

FIG. 10 shows the basic state machine and state transitions for the bus error handler. The key challenge for the bus error algorithm on the Xbus is to diagnose errors so that system operation can continue. Unlike previous systems that use duplicated buses to allow all functional units a guaranteed path for communications, when the Xbus removes a bus from service, it must also remove one of the two units attached to that bus. In some cases, the right thing to do is obvious. In other cases, it is not. The following sections analyze various faults, how they are handled and how they manifest themselves.

Bus Error Broken Conditions

At this point it would be helpful to classify the different types of conditions that cause a board to go broken when a bus is detected bad.

loopback on control—C and D ASICs must always agree on what to drive on the control lines, including whether or not to assert bus error. If one ASIC asserts bus error and the other side does not, the board breaks.

loopback on data—C and D ASICs must always agree on what to drive on the duplicated info lines. When driving CD same data, ASICs compare the data they drive with the data they receive. An ASIC asserts bus error on parity errors when receiving data, and parity errors and loopback errors when driving data. Loopbacks checking is disabled when a board drives "CD different" data, such as the contents of error reporting registers or data from PCI cards. The board breaks if the two sides disagree on which bytes have or do not have errors.

arbitrary—Break the designated board in Err2 when there are bus errors signaled during CPUtest and IOtest and no board has broken by the end of Iopost2. This is called an arbitrary shoot because the fault is most likely on the backplane, so it is arbitrary as to which of the two boards connected to the faulty bus to break. Typically, the CPU is set broken, so that the system can continue with all of its I/O available, but if bit 21 of the Bus Interface State register is set then the PCIB board will be the designated board.

heuristic—a board breaks itself during Err2 if there is a bus error when it drives, but no bus error when the other board drives, and the other board did not break by the end of IOPOST2.

Xbus Fault Analysis

Figure 11:
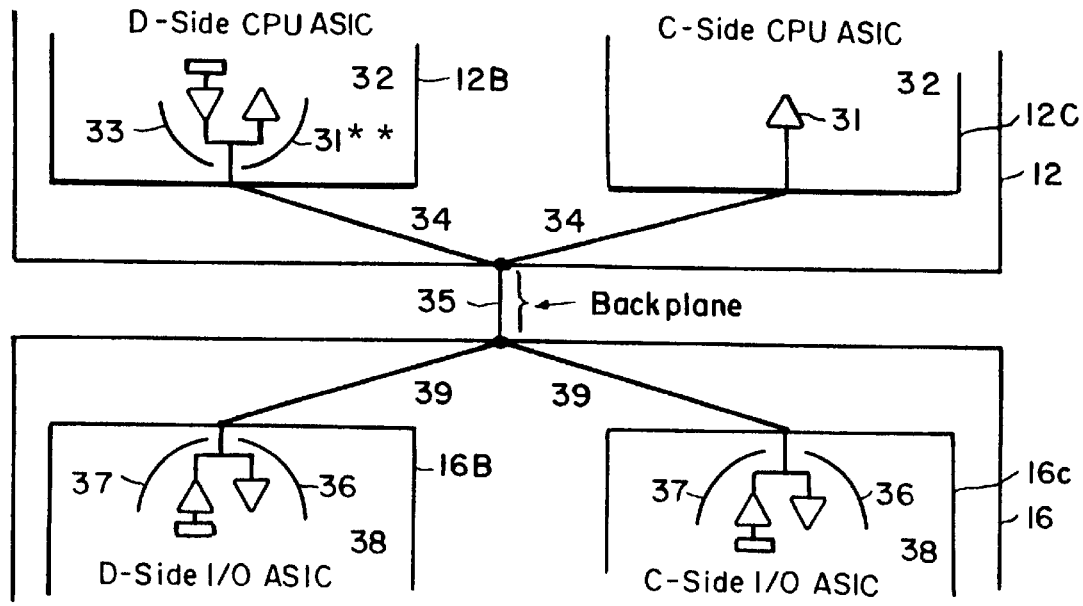
FIG. 11 depicts the interconnection between the Xbus and two functional units, or boards, connected therewith.

In order to understand various faults and what they can mean, it is important to present a detailed block diagram of the Xbus interconnect. FIG. 11 shows the interconnect for a typical Xbus line.

The black dots in FIG. 11 represent the connectors to the backplane. For fault tolerance and fault isolation reasons, it is important that the boards should be routed so that the etch between the D-side and the C-side runs through the connector connection. This limits the amount of etch on each board that cannot be isolated to a minimum. On the CPU board, one ASIC both drives and receives a given net while the other ASIC only receives that net. On the I/O board, each ASIC can potentially drive every net. The CPU ASICs are always in lockstep and therefore each ASIC is capable of sharing the data out load. However on the I/O board, each ASIC connects to a different PCI bus so a signal ASIC may need to drive the entire Xbus. There are cases in normal operation when only one CPU ASIC will drive the entire bus.

Fault Conditions

The following sections identify all known fault conditions and describe their handling. Refer to FIG. 11 to determine the location of the fault site indicated. That figure depicts two functional units (or board), e.g., units 12 and 16, as well as their respective drive and check sides 12B, 12C, 16B, 16C.

CPU Board Faulty Input Circuit—CPU Driving fault site 31 break via loopback on control fault

This fault deals with a fault in the input section of one of the CPU ASICs. In this case, the fault occurred during or just before a cycle in which the CPU drove the info bus. The error is detected when the CPU drives the bus. The ASIC with the faulty circuit will signal a bus error during the Post2 phase of the cycle and the other side ASIC will not. The board will go broken and drive bus error during Err1. The error sequence will be executed, and the operation will be retied by the partner CPU with no error.

CPU Board Faulty Input Circuit—I/O Board Driving fault site 31 break via loopback on control fault

This fault deals with a fault in the input section of one of the CPU ASICs. In this case the fault occurred during or just before a cycle in which the I/O board drove the info bus. If the error is a multi-bit error that evades the parity logic, the error will be caught internal to the CPU board and the CPU board will go broken. If the error is a single bit error the faulty ASIC will detect a bus error during the Post1 phase of the transfer. The ASIC will drive bus error during Post2 of the transfer and the other side of the board will not. The board will break with a loopback on control failure in the next phase. After the error sequence, the operation will be retried by the partner CPU with no error.

CPU Board Different Data C-Side and D-Side fault site 32 break via loopback on data fault

This fault deals with an internal CPU fault that results in different data being driven out of each ASIC. The error is detected when the CPU drives the bus. The C and D ASICs will trade error status and disagree on where the error is during Post1; both C and D sides will see an error on bytes the other side drives but no error on the bytes it drives. The board will go broken and drive bus error during Post2. The error sequence will be executed and the operation will be retried by the partner CPU with no error.

CPU Board Faulty Output Circuit—Buffer to Pad Fault fault site 33 break via heuristic broken

This is a fault in the output section of the CPU ASIC resulting from an output driver circuit fault that blows in a manner that causes an internal open between the output driver and the ASIC pad, while not disrupting the functionality of the input receiver. All ASICs on the bus will detect a bus error during the Post1 phase of the transfer. The ASICs will drive bus error during Post2 of the transfer. All ASICs will detect a bus error during the CPUPost phase. No bus errors are detected during the post1 phase. The CPU board will go broken during Err2 based on the fact that it detected a bus error when it drove the bus, no bus error when the I/O board drove the bus and the I/O board did not go broken after its error sequence.

CPU Board Open—CPU Board Driving fault site 34 break via loopback on data fault

This fault results from an open due to either a broken etch or a lifted pin on he CPU board. The routing is very important for this class of fault. The etch between the C-side and the D-side should be routed through the connector pin. This limits the possibility that an open on the CPU board is mistaken to be an open on he backplane. In this case the fault occurred during or just before a cycle in which the CPU drove the info bus. The error is detected when the CPU drives the bus. During the Post1 phase, the driving ASIC will not see an error but the checking ASIC will signal a compare error. During Post2 the board will go broken and drive bus error. The operation will be retried by the partner CPU with no error after the error sequence.

CPU Board Open—I/O Board Driving fault site 34 break via loopback on control

This fault results from an open due to either a broken etch or a lifted pin on the CPU board. The routing is very important for this class of fault. The etch between the C-side and the D-side should be routed through the connector pin. This limits the possibility that an open on the CPU board is mistaken to be an open on the backplane. In this case the fault occurred during or just before a cycle in which the I/O board drove the info bus. The ASIC with the open between it and the connector will detect a bus error during Post1. During Post2 one ASIC will assert bus error and the other will not, causing the board to break. The operation will be retried by the partner CPU without any error after the error sequence.

CPU Board Short fault site 34 break via arbitrary broken

This fault deals with a short on the CPU board. When the fault occurred and who was driving the info bus during the fault are not relevant to this class of fault. During Post1 of the transfer all ASICs on the bus will detect a bus error. The ASICs will drive bus error during Post2 of the transfer. Both ASICs on the CPU will detect a loopback error during the CPUPost phase and the ASICs on the I/O board will signal a bus error during IOTest. The ASICs will detect a bus error during the IOPost1 phase and signal a bus error during IOPost2. During Err2 the designated board will go broken based on the fact that it has detected bus errors during the error sequence and no other boards went broken after the error sequence.

Backplane Open Etch fault site 35 break via arbitrary broken

When the fault occurred and who was driving the info bus during the fault are not relevant issues for this class of fault. During Post1 of the transfer some ASICs on the bus will detect a bus error and drive bus error during Post2. Both ASICs on the I/O board will detect a bus error during CPUPost. The CPU ASICs will detect a bus error during IOpost1. During Err2, the designated board will go broken based on the fact that it has detected bus errors during the error sequence and no other board went broken during that error sequence.

Backplane Short fault site 35 break via arbitrary broken

When the fault occurred and who was driving the info bus during the fault are not relevant issues for this class of fault. All ASICs on the bus will detect a bus error during Post1 and drive bus error during Post2. All ASICs on the bus will detect a bus error during CPUPost and IOPost1. During Err2, the designated board will go broken based on the fact that it has detected bus errors during the error sequence and no other board went broken during the error sequence.

I/O Board Faulty Input Circuit fault site 36 break via loopback on control

This fault deals with a fault in the input section of one of the I/O Board ASICs. For this particular fault, it is irrelevant who was driving the backplane when the fault was detected. The faulty ASIC will detect a bus error during Post1. During Post2 of the transfer, the faulty ASIC will drive bus error and the other ASIC will not, causing the board to go broken. If it was a CPU initiated request the operation will be retried by the CPU with no error after the error sequence. If it was a request initiated by the I/O board, then the request will be dropped.

I/O Board Output Circuit Fault—Buffer to Pad fault site 37 break via heuristic broken

This is a fault in the output section of the I/O board ASIC. This class of fault results from an output driver circuit fault that blows in a manner that causes an internal open between the output driver and the ASIC pad, while not disrupting the functionality of the input receiver. All ASICs on the bus will detect a bus error during Post1 of the transfer and drive bus error during Post2. No error is detected during the CPUPost phase. The I/O ASICs will detect a bus error during IOpost1. During Err2 the I/O board will go broken based on the fact that it has detected a bus error when it drives the bus, no bus error when the CPU board drove the bus and the CPU board did not go broken after its error sequence.

I/O Single-side Access—ASIC Parity Gen. Fault fault site 38 break via internal parity generator broken

A fault in the parity generation logic during single side accesses (data driven entirely by either the C or D ASIC) could cause the system to bus error forever. The otherside ASIC doesn't know the data, and has no way of checking the parity. For this reason, the info bus parity generation is duplicated and selfchecking inside of the Gambit ASICs.

I/O Single-side Access—ASIC PCI Data Path Fault fault site 38 break each PCI slot due to checksum and may RAM errors

This is a fault within the ASIC's PCI data path. This hardware is not running in lockstep with the other side of the board and therefore is not self-checking. Eventually bad addresses produced by the PCIB will cause map RAM errors and/or data checksum errors in the CPU ASIC. The CPU ASIC noACKs accesses that cause map RAM errors, and the PCIB sets off-line the PCI slot that originated the noACKed cycle based on an option bit in the Configuration register in page zero of SAM compatible I/O space. Eventually, all PCI slots handled by the detective ASIC will be set broke. In the meantime corrupted I/O data is detected by checksums and handled by higher level protocols.

I/O Non-single-side Access, Different C-D Data fault site 38 break via loopback on data

This fault deals with an internal I/O board fault that results in different data being driven out of each Gambit ASIC during a regular (not single-side) read return. Each ASIC will disagree with the data driven by the other side and the board will break with a loopback on data error. The error sequence will be executed and the operation will be retried by the CPU and get noACKed.

I/O Board Open fault site 39 break via loopback on control

This fault deals with an open, either from a broken etch or a lifted pin on the I/O board. The routing is very important for this class of fault. The etch between the C-side and the D-side should be routed through the connector pin. This limits the possibility that an open on the I/O board is mistaken to be an open on the backplane. The driving ASIC sees no errors and the outside ASIC asserts bus error; the board breaks the following phase with a loopback on control fault. After the error sequence the operation will be retried with no error and get noACKed.

I/O Board Short fault site 39 break via arbitrary broken

This fault deals with a short on the I/O board. When the fault occurred and who was driving the info bus during the fault are not relevant issues for this class of fault. During Post1 of the transfer all ASICs on the bus will detect a bus error and then drive bus error during Post2. All ASICs on the bus signal a bus error during CPUpost and IOpost1. During Err2, the designated board will go broken based on the fact that it has detected bus errors during the error sequence and the other board did not go broken after its error sequence.

Transient Fault fault site anywhere action depending on fault site and timing

This fault deals with a transient fault. A transient fault is defined as a fault that is detected, but cannot be reproduced by the error sequence. If the fault is on the driving board and it is caught by loopback check, that board will go broken. If this is not the case then no board will break until Err2, then the designated board will go broken.

Slow Driver Fault fault site 34, 39 possibly break the wrong board with a loopback on control fault

When an ASIC with a marginally slow driver drives the bus, four ASICs clock in data from the net while the net is changing. Due lots, its possible speed between ASICs from different lots, its possible that some of the ASICs will detect a bus error, and some won't, resulting in a loopback on control fault. This may result in one or both of the boards on the bus going broken.

Board Not Broken Generation

The board_not_broken_out signal is generated by all boards. If a board is going to break the normal operation is for the board to assert bus error. All boards will enter the error sequence and the board that was going to break will de-assert board_not_broken_out during the error sequence. It is possible that a board could break without asserting bus error. This could only happen if there is a problem with asserting bus error on the d-side gate array (for instance the clock line going to the flip-flop that produces the control signal (bus error) opens).

Arbitrary Breaking

There are a series for cases mentioned before that error logic cannot determine where the fault is. For these cases the goal is to not use the bus that the two boards are connected to. The default is to break the CPU board (designated board). This makes sense because there is a partner running in lock-step so no connectivity is lost. It is possible that the CPU board will break but the fault really lies with the PCIB. The only way this will pose a problem is if the failure in the PCIB effects the other bus that is still connected and is being used. Normally it is the CPU board that is the designated board.

Xbus Fault Tolerance

The goal for fault tolerance on the Xbus is for no single point of failure to cause a system crash or allow a transaction to complete without transmitting the correct data. A single point of failure could be any component, any signal, or any pin on a component.

The Xbus fault tolerance scheme assumes that one of the components connected to the bus is always responsible for hard bus errors. To this end, the design has been simplified around the assumption that when an error occurs, an offending board, or Field Replaceable Unit (FRU), will be removed from service. This extends to include all buses that the FRU is connected. Thus when an Xbus fault occurs the faulted bus service is removed taking at least one FRU with it.

Both sides of the CPU board drive signals to the bus and both sides of the board perform various checks to ensure that the board is functioning normally. This is identical to the Golfbus methodology. The PCIB board behaves differently; both sides of the board drive and check the bus when driving data from Xbus related IO registers, and when driving data originating on a simplexed PCI card, only one ASIC drives and checks the entire width of the bus.

Info Bus Protection

The info bus is protected by parity and loopback checking. However there is no A to B bus cross checking by anyone on the bus other than the bus master. When a PCIB is bus master only one of the two buses attached to a given CPU module will be active because the PCIBs do not duplex and therefore the bus from the PCIB that did not win arbitration must be idle. Likewise the PCIBs cannot know if two duplexed CPU modules are driving the bus or a single simplexed CPU has ownership (two simplexed CPUs could have started arbitration at the same instant). Thus receivers on the Xbus will only listen to the bus that is driven by the module that won arbitration.

Parity

Parity is generated and transmitted across each of the physical buses. The 32 bit bus, trid field, and funcop bits are all covered by a single parity bit. The purpose of the parity check is to protect against etches that open between the transmitter and receiver. Boards in the system check the transmitted parity that they receive with parity that they generate themselves.

A bus error is signaled on any parity error. The bus_err signals are also effected by other error checking that is described later in this document. In an effort to simplify these descriptions the reader may assume that the actual error signals are a logical OR'ing of the various outputs from different checking blocks.

Both the C and the D-sides of the boards will perform the check and compare results individually and decide on any action that must be taken. In the event that the two sides of a board do not agree upon the statute of a bus cycle, the board will break in the following cycle in one of two ways.

The D-side of the board detected an error and the C-side did not. In this case the D-side will drive a bus error and the C-side will disagree with what the D-side has done and break the board. Here the transaction is error and repeated, but the broken board should no longer be checking and the transaction will complete.

The C-side of the board detected an error and the D-side did not. Here the C-side will once again break the board, but this time because it expected to see an error on the bus and didn't.

The transaction will complete normally and the bad board will be removed from service.

CPU boards compute parity in both C and D ASICs and break if a defect arises in one side's parity generators. Most of the transfers from a PCIB board, however, originate from a PCI bus connected to a single Gambit ASIC. When the Gambit drives this single sided data, it drives all the bits on the Xbus, and an error in the simplexed parity generator would hang the system. Fortunately, there is no need to duplicate the entire Gambit ASIC, only the parity generation section.

Figure 12:
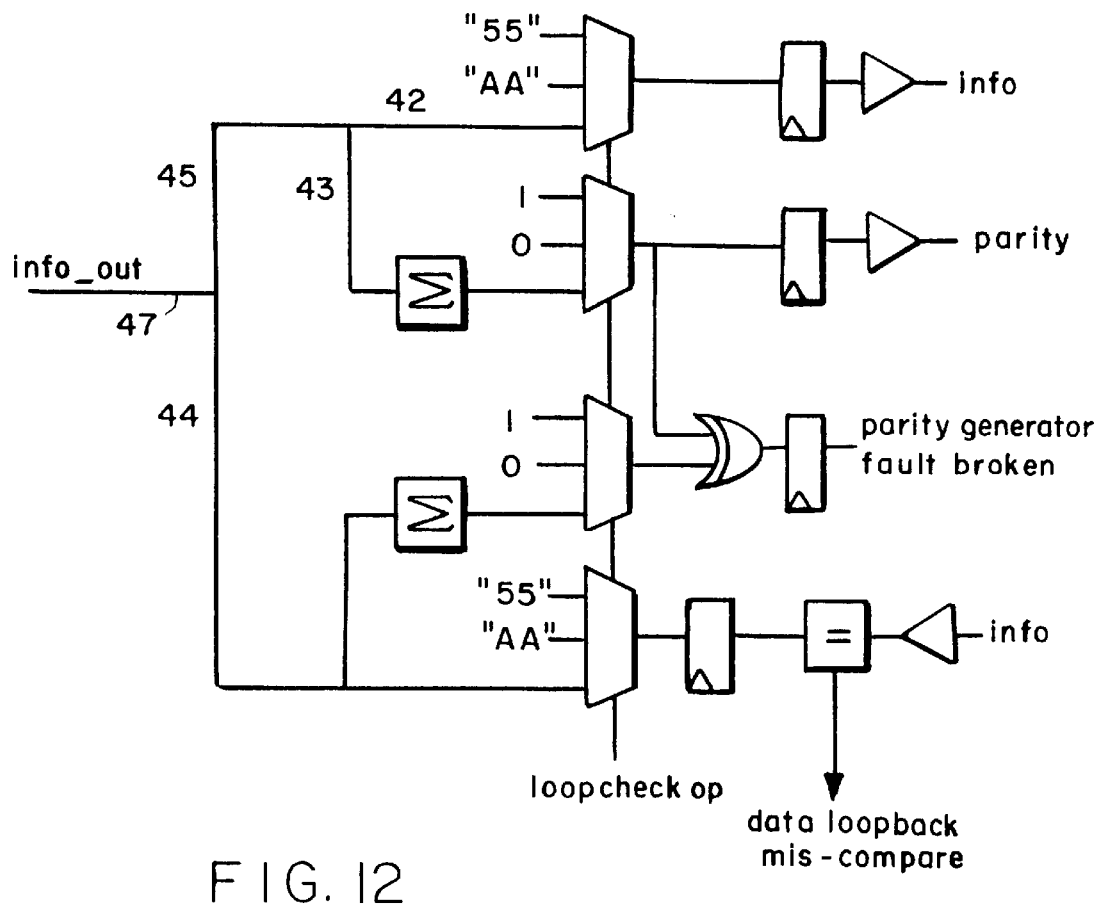
FIG. 12 depicts self-checking parity logic used in connection with an Xbus.

Referring to FIG. 12, a fault at site 41 causes erroneous data to be transmitted with correct parity. This will be detected by higher level checksums. A fault at site 42 will cause the board to break with a data loopback fault. A fault at site 43 will cause the board to break with a parity generator fault. A fault at site 44 or 45 will break the board with either a data loopback fault or a parity generator fault.

Loopback Checking

Figure 13:
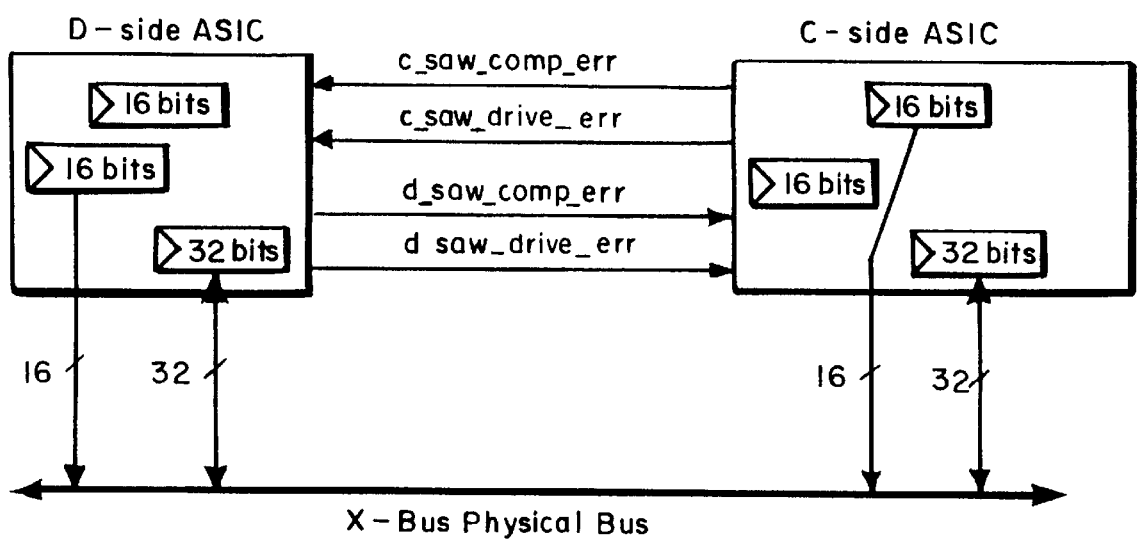
FIG. 13 depicts loopback connectivity used in connection with practice of the invention.

The loopback correctivity is shown in FIG. 13. On normal accesses (non-CD different, non-single sided), each side of the board drives half of each field to the bus and receives all of both busses. Thus there are two checks that each ASIC can do on the data returning from the bus.

1: Does the returning data match the data that was driven from this ASIC. This will be known as the loopback drive check.

2: Does the returning data match the data that was driven by the other ASIC. This will be known as the loopback compare check.

Two error signals are generated inside of each ASIC for each physical bus that it is driving. In order to know the true state of the board each side of the board must know the results of the comparisons on the other side as well as the comparisons it has done. Thus two signals are passed in each direction, as shown in FIG. 13, so that the each side may correctly determine the state of the board. Each ASIC will determine whether the data on the bus is faulted or not, as well as if this broken or not. Table 4 below shows what combinations of the loopback signals for indicate that the board is broken.

TABLE 4

Board Broken Matrix for a Single Bus

| mt drive_err | my comp_err | drive_err from the other side of the board | comp_err from the other side of the board | brd_broken |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 0 |

A double bus error will be asserted and the not_broken signal de-asserted if a condition exists that should break the board. In addition a bus error will be asserted for any condition where a compare error of any type has occurred and the board has not broken. The bus error will only be on the bus while the error is detected.

Loopback on CD Different Accesses

When an ASIC drives data from a CD different register on the bus, it performs loopback checking only on the trid, func_op_, and parity lines. It asserts bus error if it sees an error, and will go broken according to table 4.

Loopback on Single-side Accesses

When a Gambit ASIC drives single-side data from the PCI it performs loopback checking on all of the bits; it does this only for the purpose of asserting bus error, not to see if it should go broken. It will not break according to table 4, because the cmp_err and drive_err signals from the other-side are invalid. However, if the driving ASIC sees a bus error, and the otherside ASIC does not (parity received good), the board will break due to a loopback on control fault.

Loop_ck_ops

Loop_ck_ops are used during the error sequence to make intelligent choices about the state of various boards and the buses that they are attached to. A loop check op is a cycle in which a board drives an alternating pattern of AA's and 55's on the backplane. The board evaluates the pattern and similar patterns driven by boards on the other end of the bus. Based on this information, bus state is altered.

Control Bus Protection

The Xbus collects control signals into a series of point-to-point unidirectional signals protected by an ECC code. Each board drives a separate control bus to each of the other boards.

There are two completely independent types of checks performed:

1: Every ASIC corrects for any single point failures (shorts, opens, dead drivers or receivers) with a single error correcting, double error detecting ECC code.

Single bit failures cause a maintenance interrupt and are logged, but otherwise have no effect.

2: If a driving board detects a double bit error on the outgoing control signals it will attempt to assert bus error and then it will break in the error sequence (it will break regardless of its ability to drive bus error). If a receiving board detects a double bit error on any incoming control signals it will attempt to assert bus error then it will break in the error sequence. If the error was actually on one board and only one board saw the error then the correct board will break. If the error was such that both boards saw it then both boards will break. This is to limit the possibility that data gets corrupted.

Threeway Voted Signal Protection

Some broken and reset related control signals on the Xbus are triplicated and voted. The reset and board_not_broken_out signals are buffered through transceivers because they must be valid during power up or power down events. The CPU signal sync_out is buffered through transceivers to reduce ASIC pin count. The CPU signal my_online_out is sourced directly by the ASIC as a cost reduction.

The D-side ASIC drives signals to the transceivers and to the C-side ASIC. The C-side of the board checks what was driven by the D-side with what it thinks should have been driven. If the C-side disagrees with the D-side the board breaks.

Each ASIC that receives a three-way voted signal will perform a majority voting algorithm on the three signals to determine the value. In normal operation all three lines will be the same. If there is a fault on one of the three lines (either on the backplane or on the board), two of the three lines still will agree.

When a voting error occurs, the device detecting the fault should send a maintenance interrupt and log which transceiver has the non-unanimous vote. The logged information is stored in the Vote Error Transceiver Status register(s) and will not be over-written until the status register is explicitly re-enabled by software.

Error Reporting

A number of errors can be detected by a board's bus interface logic:

1: A loopback error that breaks the board. This specifically refers to loopback errors on the info, parity, TRID, and func op signals which are seen by one side of the board and not the other during bus cycles in which the board drove the bus.

2: A disagreement between the two-sides of a board on whether a three-way voted signal should be driven.

3: A parity error on the bus, either on a cycle where the local board was driving the bus or another board was driving the bus.

4: A loopback error on the bus.

5: A three way voter error in which not all three signals are in agreement.

6: Any bus error signaled by any board in the system.

7: A thermal fault (high temperature detected on the board).

Some of the above errors may break a board (e.g. #31 and 32), some may cause a bus error to be generated (e.g. #33,34 and 36), and some have no effect on normal machine operation (e.g. #37). The Xbus interface contains two classes of status registers to record information surrounding the above errors: Broken Status and Error Status. Broken Status registers are only activated when a board goes broken, and are designed to pinpoint the logic that set broken. Error Status registers are for reporting non-fatal errors such as faults on the backplane. All of the Error Status registers are updated simultaneously on any bus error signaled by the system, or a voter or thermal error on the board. Specifically, when all error reporting is enabled, any of the above errors cause:

1: A maintenance interrupt to be generated.

2: The type of error condition to be stored.

In the above case, subsequent error state recording and the resulting maintenance interrupts are disabled until explicitly re-enabled.

It is not always optimal that all the above errors trigger the error registers and generate a maintenance interrupt. The reporting of new errors can be effectively blocked by an excessive number of reports on a known error. Hence, it is possible to turn off error latching due to different sources:

1: Perform error latching and maintenance interrupts on all errors.

2: Inhibit error latching and maintenance interrupts of incoming three-way voter errors.

3: Inhibit error latching and maintenance interrupts on thermal failure related errors.

The error latching disable bits inhibit those faults from triggering the error registers. However, if a disabled error is present and non-disabled error occurs, both errors will be recorded in the error registers.

Producing Errors

The Cyclops and Gambit gate arrays have specific registers which allow software to produce various errors on the Xbus.

The basic logic to produce an error consists of XOR gates on all the info, trid, func_op, parity, control lines going out and all the same lines coming in. One input on the XOR is the data line the other input is the error line and the output is the resultant data. If the error line is high the data coming out will be in error. If the error line is low then the data coming out will be in the form of a loopback error. If the data is error on the input and the output then the error will be in the form of a bus error since it will not be a loopback error.

Table 5 shows all the error cases and the necessary settings from a hardware point of view to produce the error. 'Receive error' means the XOR gate on the receive side is inverting. 'Transmit error' means the XOR gate on the transmit side is inverting. The category describes if the error occurs only on a particular pattern match or if the error occurs just after the register is written. For many cases it would be possible to produce an error with different cases than those described below. The goal is to only produce the error in one manner.

TABLE 5

Error Settings

| Type of Error | Category | D-Side | C-Side |
|---|---|---|---|
| CPU Board Error | | | |
| CPU Board Faulty Input Circuit - CPU Driving | Immediate | receive error | no error |
| CPU Board Faulty Input Circuit - I/O Board Driving | Data Match | receive error | no error |
| CPU Board Different Data C-Side and D-Side | Immediate | transmit error/ receive error | no error |
| CPU Board Faulty Output Circuit - Buffer to Pad Fault | Immediate | treansmit error | no error |
| CPU Board Open - CPU Board Driving | Immediate | no error | receive error |
| CPU Board Open - I/O Board Driving | Data Match | receive error | no error |
| CPU Board Short | Immediate | transmit error | no error |
| Backplane Error | | | |
| Backplane Open Etch | Data Match | CPU and IO board transmit error/ receive error | CPU and IO board receive error |
| Backplane Short | Immediate | CPU and IO board transmit error | CPU and IO board no error |
| IO Board Error | | | |
| I/O Board Faulty Input Circuit | Immediate | receive error | no error |
| I/O Board Output Circuit Fault - Buffer to Pad | Immediate | transmit error | no error |
| I/O Single-side Access - ASIC Parity Gen. Fault | Immediate | parity gen. fault | no error |
| I/O Single-side Access - ASIC PCI Data Path Fault | Immediate | bad address | no error |
| I/O Non-single-side Access, Different C-D Data | Immediate | transmit error/ receive error | no error |
| I/O Board Open | Immediate | no error | receive error |
| I/O Board Short | Immediate | transmit error | no error |
| Transient Error | | | |
| Transient Fault | This causes a bus error, but when the error sequence is executed there will be no error. This fault will not produce a maint. int. from this board, but all the other boards will assert maint. int. | | |
| Bus Busy | | | |
| Bus Busy | This causes a bus busy. | | |

Board Breaking Timing

Note in the figures FIGS. 14–17, Info_O's shows the time the info bus is driven to zero assuming that the bus is not already tristated from this side, xcever_disable shows the time the drivers from the broken board are disabled from the bus. Bus error is also shown when valid on the Xbus.

Board Breaking and Information Latching

There are several status bits in the Broken Status register on each board to determine the reason a board went broken. These bits are frozen after a broken condition occurs and will remain frozen until after a cold reset. All bits in the common register are straight forward with the exception of board_specific_set_broken. Board specific logic may have several reasons to assert this signal and may also have a similar register for the reasons it has asserted this signal. If board_specific_broken is set in the common register, the board specific broken register will contain the real reason the board asserted the board_specific_set_broken signal. If a board breaks for a reason other than board specific broken, the board_specific_broken bit will not be set in the broken status register. However, board_specific_set_, broken may have been asserted after the original broken condition. This would have caused the board specific broken status register to latch and hold a reason it had set broken. It is important to understand that because the board_specific-broken bit is not set in the common status register, this was not the reason the board went broken. The reason the board went broken is logged in the broken status register and the board specific status register may be ignored.

Figure 14:
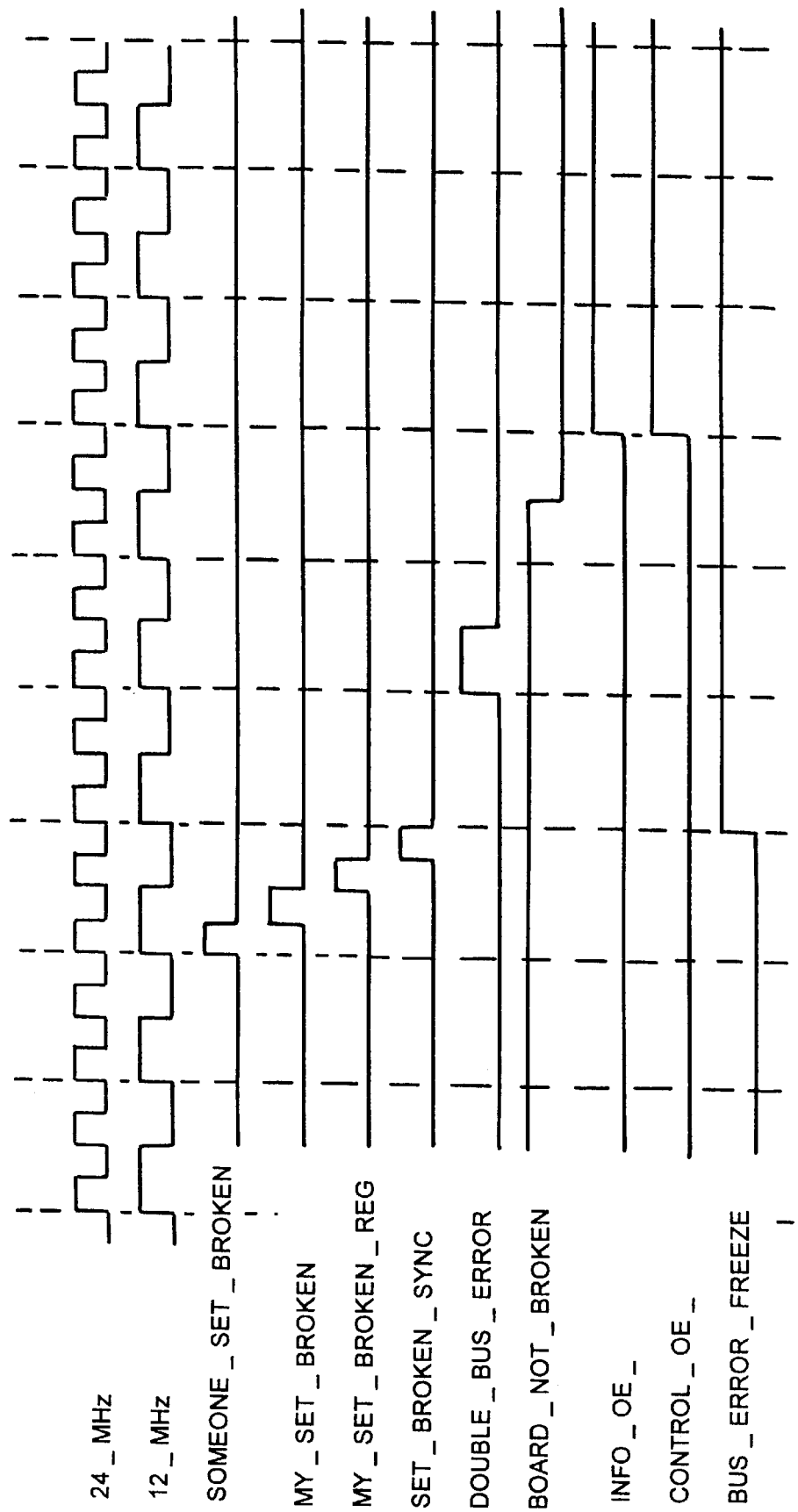
FIGS. 14 and 15 depict the timing and latching associated with the breaking of boards in connection with practice of the invention.
Figure 15:
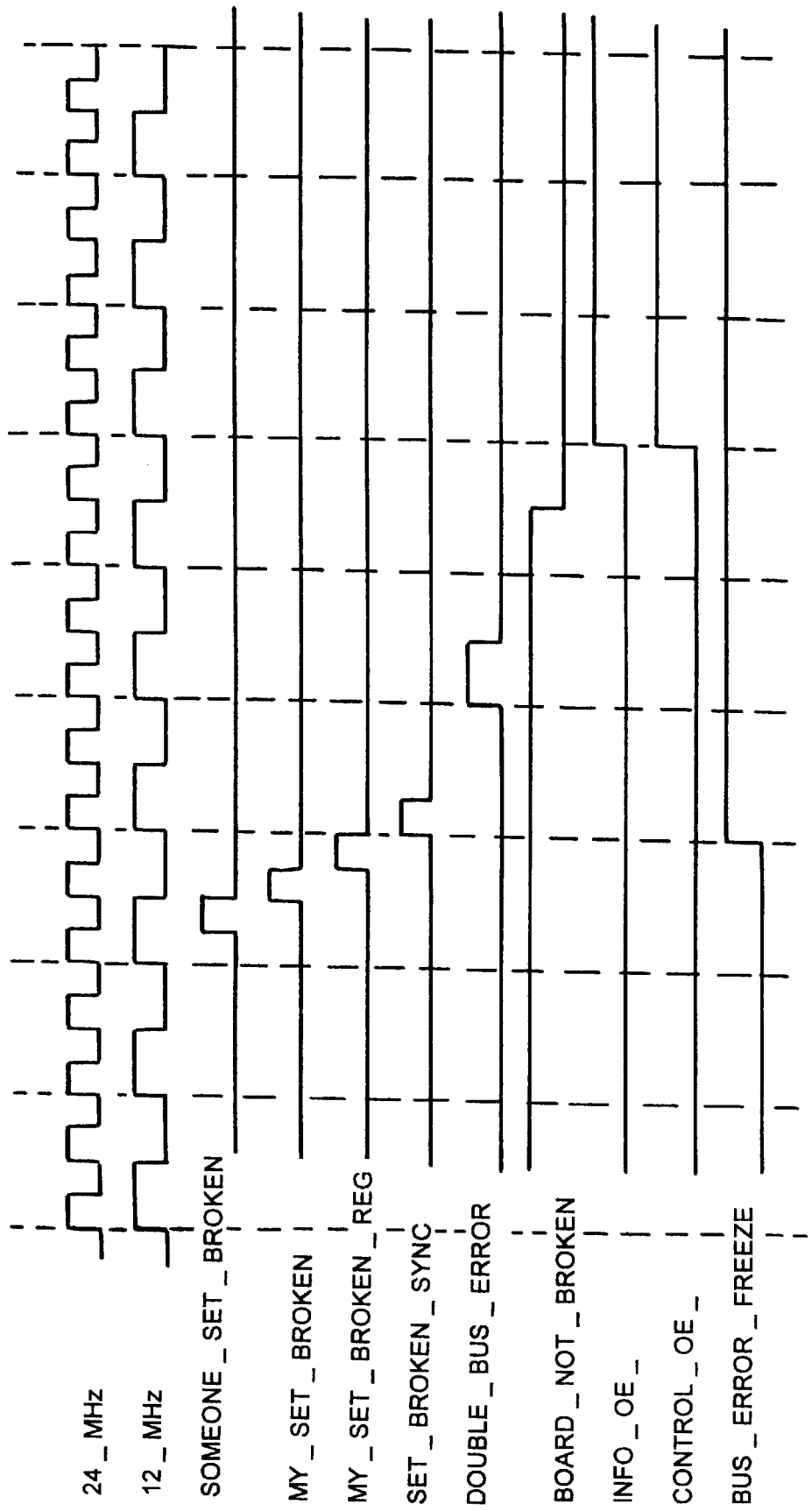

In the timing diagram of FIGS. 14 and 15, someone_set_broken is the logical OR of the following signals:

cold_reset, warm_reset, slot_parity_error_set_broken, control_or _3way_vote_sig_error, asic_specific_set_broken, ecc_dbl_error_in. In addition Gambit contains the following signals: break_pcib, xb_parity_gen_set_broken. The board will break if any broken signal is asserted on any phase (i.e. any 48mhz edge). my_set_broken_reg is the equivalent of otherside_set_broken_reg on the other ASIC. my_set_broken_reg is ORed with otherside_set broken_reg to create set_broken_sync.

The common broken status register is frozen when latched_broken_status is true. Note, All status signals for the I/O register have the same timing as broken.

Note the bus error driven on the bus at the time the board went broken. This timing is important.

Board Breaking Timing on Info Loopback Error

Figure 16:
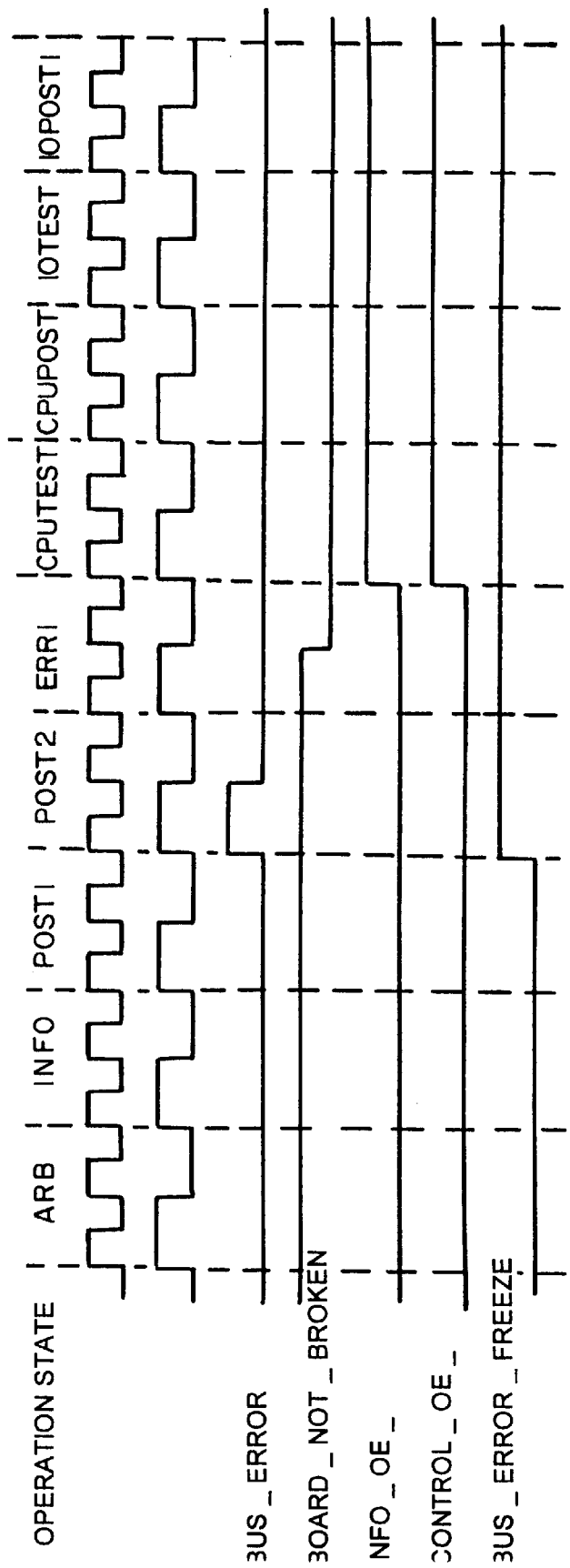
FIG. 16 depicts the timing of board breaking in response to loopback errors according to a practice of the invention.

As shown in FIG. 16, if a loopback error occurs that will break the board, bus_error will be asserted in POST2 and the board will break in ERR1. Both ASICs will know of the error because of there are four lines for each info bus that communicate loopback status between the ASICs (cmp_err_in, cmp_err_out, drive_err_in, drive_err_out.

Board Breaking Timing on Heuristic or Arbitrary Broken.

Figure 17:
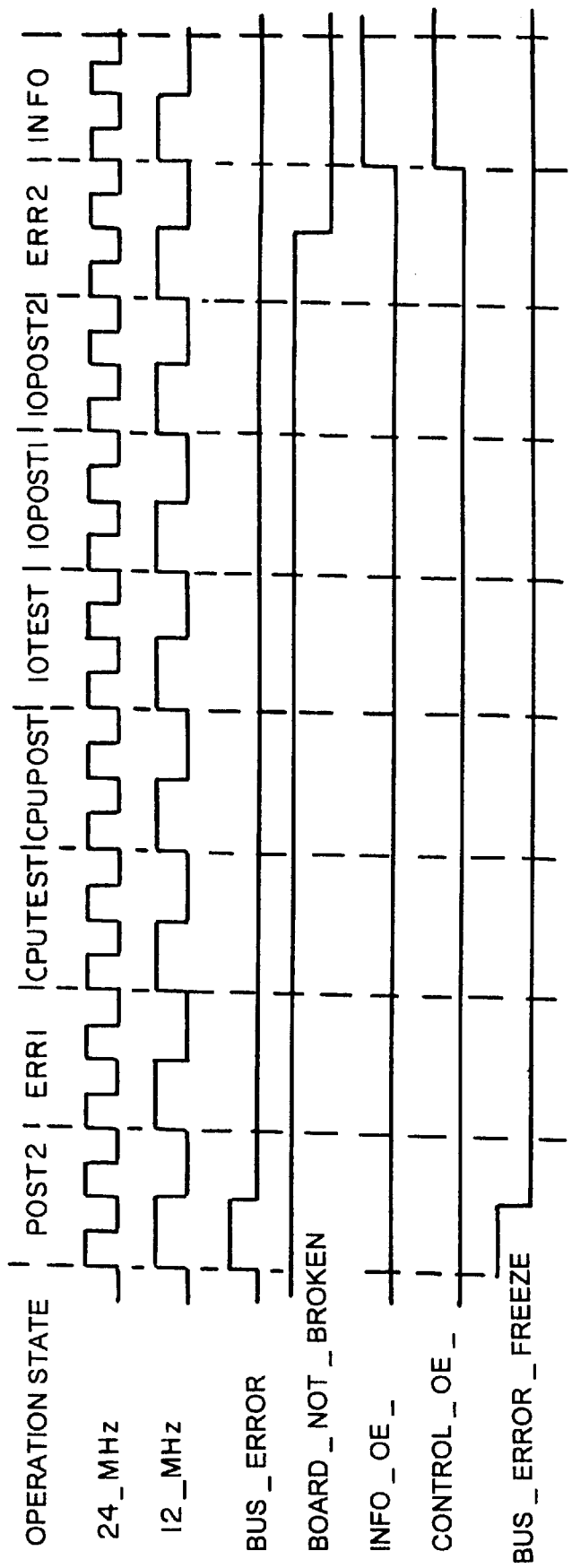
FIG. 17 depicts timing of board breaking in response to heuristic or arbitrary breaking in accord with a practice of the invention.

As shown in FIG. 17, boards that break due to a Heuristic or an Arbitrary broken will participate in the entire error sequence and then deassert board_not_broken in ERR2.

Xbus Physician Partitioning

This section gives a high level overview of the physical partitioning for the interface ASICs to the Xbus. It describes the components necessary to interface to the Xbus as well as a functional description of how the interface is intended to operate. The fault tolerant strategy is also described.

Info Bus Partitioning

Figure 18:
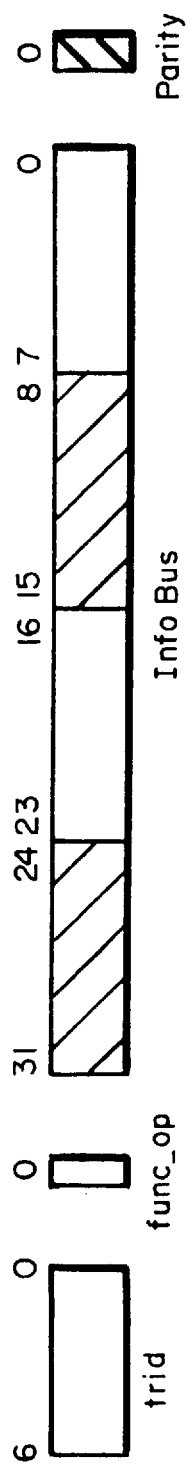
FIG. 18 depicts partitioning of the Xbus in accord with a practice of the invention.

As shown in FIG. 18, the C and D ASICs on the CPU board each drive half of the bits on the info bus when they are bus master. The C and D ASICs on the PCIB drive either half or all of the bits, depending on the type of transfer. During normal accesses, they drive half the bits as shown; during single-side accesses, they drive all of the bits, including the parity bit.

Control Signal Partitioning

The D-side ASICs drive the control buses, and both C and D-side ASICs check.

Xbus Voted Signal Partitioning

The 3-way voted signals in a Polo system have varying topologies depending on function. In general, each ASIC on a board drives half of the 3-way voted signals originating on a board, and the other side ASIC sits at the end of the net and checks what is driven.

Figure 19:
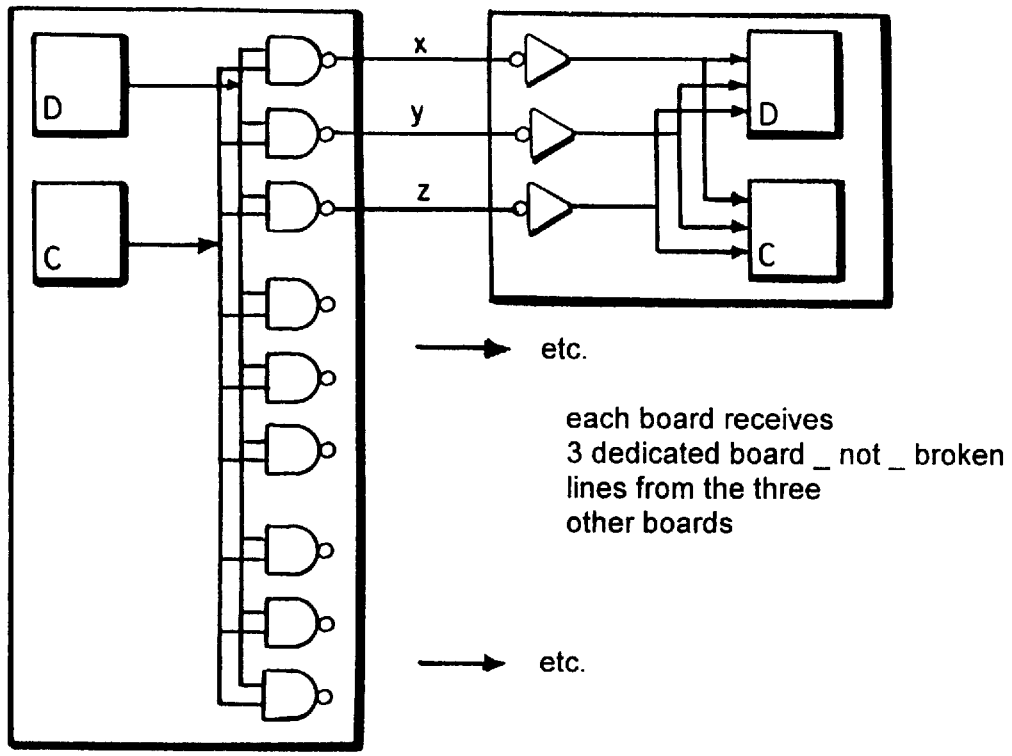
FIG. 19 depicts circuitry for routing board_not_broken in connection with practice of the invention.

FIG. 19 shows the 3-way voted signals for board_not_broken_routing. Each transceiver section (shown as a NAND gate or inverter) of a 3 way voted triplet is in a separate package, to prevent a single failure from disturbing more than one bit of the triplet.

Signal Routing

Figure 20:
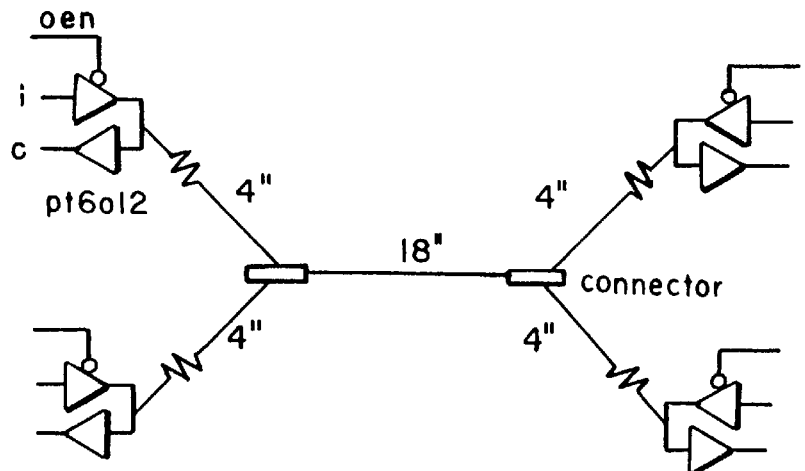
FIG. 20 depicts the routing of information lines in accord with practice of the invention.

The bi-directional info buses are routed point to point between boards. On each board, separate traces run from the connector to each ASIC; this allows the error protocol to determine if a fault is in the backplane or in the board. Series resistors are used to control signal quality, nd CMOS levels re used for increased noise margin and reduced susceptibility to cross-talk. FIG. 20 shows the routing of info lines.

Figure 21:
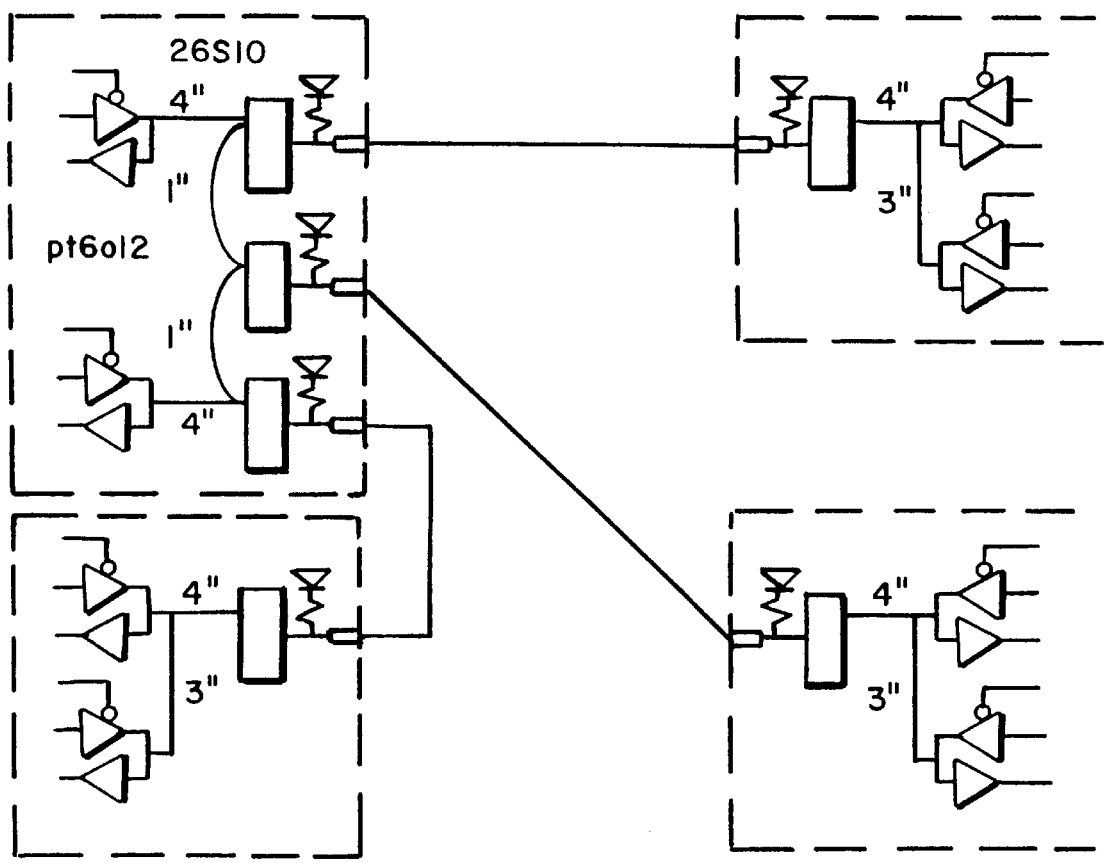
FIG. 21 depicts routing of 3-way voted lines in connection with practice of the invention.

As shown in FIG. 21, the three way voted signals are routed as separate point to point connections. The reset__x, __y__, z__signals are driven by the CPU boards, wire-ORed on the backplane, and received by all boards. The board __not__broken__signal is driven by a single board and received by all boards. These signals are drive by normal 4mA drivers of the ASIC, and buffered by 26S10 transceivers. The voted signals are terminated with a pullup and isolation diode on both the receiver and driver side. This means that it is possible for there to be one or two pullups on the line. However, whenever the line is being used for activity signaling, there are exactly two terminators, one at either end of the line.

Functional Description

Figure 22:
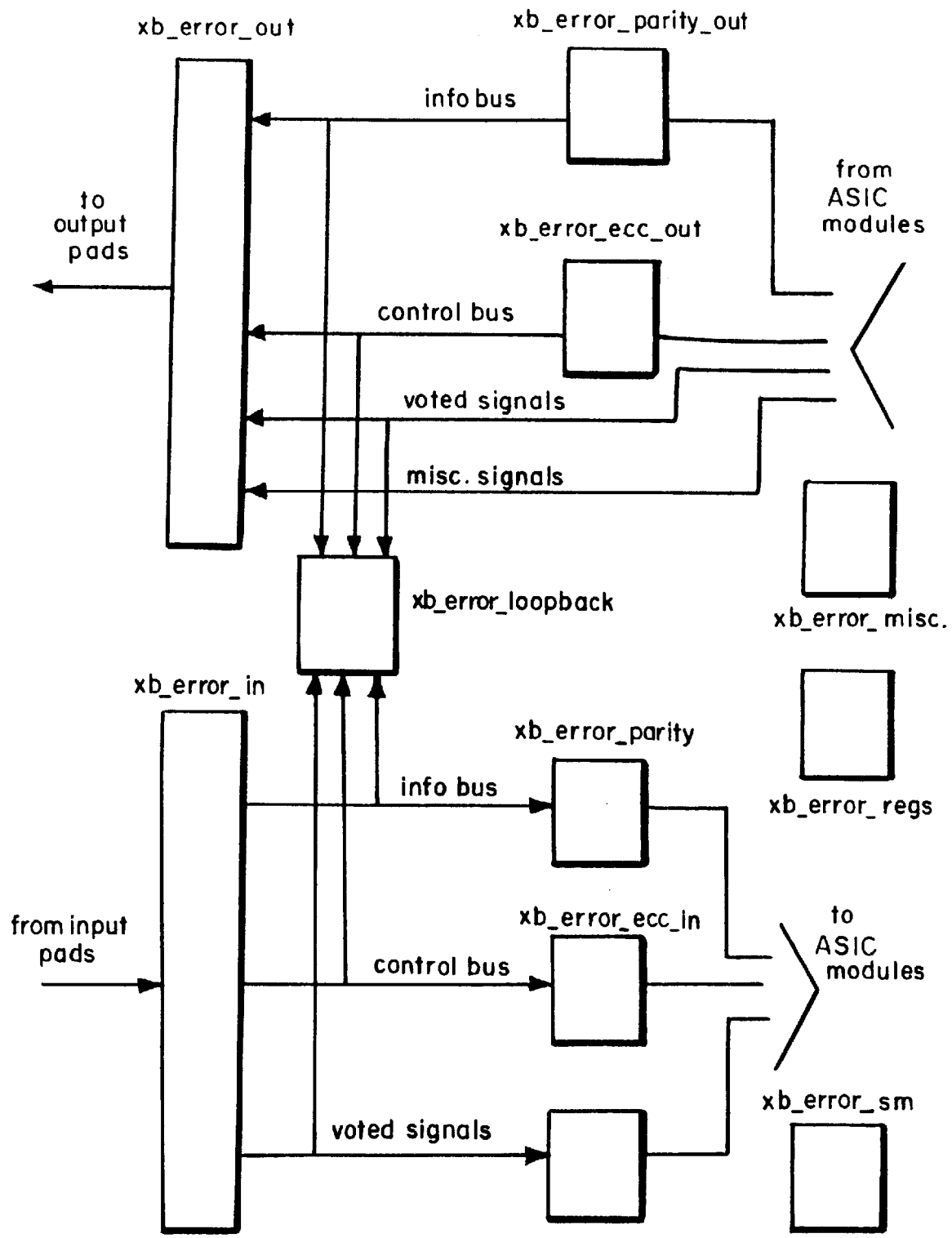
FIG. 22 depicts error checking logic in accord with practice of the invention.

FIG. 22 is a block diagram of the error check logic used by the ASIC's. The Error Checking and Registering logic performs two basic functions. It controls most functions or error checking and it registers incoming and outgoing Xbus signals. The error checking function performs the following tasks:

ECC generation and checking/correcting

Parity generation and checking

Loopback checking

Three-way voting

Controls error protocol (includes decisions on breaking board)

Provides logic for error insertion

Records error information

The registering logic performs the following tasks:

registers incoming bus signals registers outgoing bus signals combines (logical 'or') neighbor, opposite, peer versions of registered ECC corrected control signals coming into the ASIC with the delayed outgoing corresponding signal to produce a combined control signal for internal ASIC module use The Xbus can be broken into four classes of signals when discussing error checking:

Xbus Signals: these signals are protected by one parity bit, this detects an odd number of errors. During normal accesses the D-side gate array drives approximately half of the signals and the C-side drives the other half. Please refer to Section 11.1 on page 96 for more detail on the signals that are driven by D-side and C-side. The D-side checks the data it has driven (loopback drive check) and the D-side checks the data that the C-side had driven with the D-side would have driven (loopback compare check). During single sided accesses (PCIB only) the driving ASIC drives all of the bus signals. The driving ASIC can do a loopback drive check but the other ASIC cannot it has no know compare check because it has no knowledge of the exact data being driven.

Control Bus Signals: these signals are protected by four bits of ECC, this detects a double bit error and can correct a single bit error. The D-side drives the signals and the C-side does the loopback compare check. The D-side does the loopback drive check.

Voted signals: these signals are triplicated and protected by three-way voting, this allow for one out of the three lines to be in error. The D-side drives the signals and the C-side does the loopback compare check. The D-side does the loopback drive check. The one exception to D-side driving all signals is the board__not__broken__signal. The C-side will drive the board__not__broken__signal and the D-side will drive the enable for the board__not__broken__signal.

Miscellaneous signals: The slot id signals are duplicated and they are in disagreement the board will break.

FIG. 10 shows the Bus Error flow chart, summarizing the foregoing.

SUMMARY

Described above is a digital data processing system meeting the aforementioned goals. Those skilled in the art will appreciate that the illustrated embodiment is but one example of the invention and that other embodiments incorporating modifications thereto fall within the scope of the invention, of which

We claim:

1. A fault-detecting and fault-isolating digital data processing apparatus comprising:

plural functional units, plurality of bus means, each connected to and providing communications between a respective pair of functional units, the functional units each including:

error phase means, coupled to the respective bus means of that functional unit, for placing the functional unit in an error isolation phase substantially concurrently with the other functional units, and for transmitting test data onto at least one of those bus means during a respective portion of that error isolation phase and exclusive, with respect to that phase, of any other unit connected to that bus, bus error detecting means, coupled to the respective bus means of that functional unit, for detecting a communication error, including any of parity error, an error correction code error and a loopback error, on that bus means, and for signaling a bus error to the other functional units in the event of such communication error, error isolation means, coupled to the bus error detecting means, for signaling the other functional units during the error isolation phase that the respective functional unit is faulty based on (i) whether the bus error detecting means of that functional unit detected a loopback errors (ii) whether the bus error detecting means of another functional unit signaled a bus error in response to test data transmitted during the error isolation phase, and (iii) whether another functional unit signaled that it was faulty.

2. A fault-detecting digital data processing apparatus according to claim 1, wherein the plurality of bus means provide point-to-point communications between each pair of functional units.

3. A fault-detecting digital data processing apparatus according to claim 1, wherein the error phase means are responsive to a bus error signaled by any of the functional units for placing the respective functional units in an error phase.

4. A fault-detecting digital data processing apparatus according to claim 1, wherein the error isolation means includes means for taking off-line a functional unit that signals that it is faulty.

5. A fault-detecting digital data processing apparatus according to claim 1, wherein the bus error detecting means of at least one functional unit comprises loopback error detection means, coupled to the respective bus means and error phase means, for comparing test data transmitted onto that bus means with data received substantially concurrently from the bus means, and for signaling a bus error to the other functional units in the event of discrepancy between the transmitted and received data.

6. A fault-detecting digital data processing apparatus according to claim 5, wherein at least a selected functional unit includes:
- a processing section for generating a datum for communication to another functional unit,
- a drive-side bus interface means, coupled with the processing section, for applying a first portion of that datum to at least the bus means coupling the selected functional unit to that other functional unit,
- a check-side bus interface means, coupled with the processing section, for applying a second, complementary portion of that datum to at least the bus means coupling the selected functional unit to that other functional unit, and each of the drive-side and check-side interface means comprise means for receiving a datum driven to at least the bus means coupling the selected functional unit to that other functional unit.

7. A fault-detecting digital data processing apparatus according to claim 6, wherein loopback error detection means comprises a loopback drive check means in each of the drive-side and check-side bus interface means for comparing the portion of a datum generated by the processing section and applied to the bus means by that bus interface means with a corresponding portion of the datum received from the bus means, and for signaling a bus error to the other functional units in the event of disparity between those compared portions.

8. A fault-detecting digital data processing apparatus according to claim 6, wherein loopback error detection means comprises a loopback compare check means in each of the drive-side and check-side bus interface means for comparing the portion of a datum generated by the processing section and applied to the bus means by the other bus interface means with a corresponding portion of the datum received from the bus means, and for signaling a bus error to the other functional units in the event of disparity between those compared portions.

9. A fault-detecting digital data processing apparatus comprising:
- plural functional units, including one or more central processing units and one or more input/output interface units,
- plurality of bus means, each connected to and providing communications between a respective pair of functional units,
- each central processing unit including dual bus interface means, each of which applies a complementary portion of a datum to the bus means coupling that central processing unit to an input/output interface unit,
- each input/output interface unit including dual bus interface means, each of which applies a complementary portion of a datum to the bus means coupling that input/output interface unit to a central processing unit, the functional units each including
- error phase means, coupled to the respective bus means of that functional unit, for placing the functional unit in an error isolation phase substantially concurrently with the other functional units, and for transmitting test data onto the bus means during a respective portion of that phase and exclusive, with respect to that portion, of any other unit connected to that bus,
- bus error detecting means, coupled to the respective bus means of that functional unit, for detecting a communication error, including any of parity error, an error correction code error and a loopback error, on that bus means, and for signaling a bus error to the other functional units in the event of such communication error,
- error isolation means, coupled to the bus error detecting means, for signaling the other functional units during the error isolation phase that the respective functional unit is faulty based on (i) whether the bus error detecting means of that functional unit detected a loopback error, (ii) whether the bus error detecting means of another functional unit signaled a bus error detecting in response to test data transmitted during the error isolation phase, and (iii) whether another functional unit signaled that it was faulty.

10. A fault-detecting digital data processing apparatus according to claim 9, wherein the input/output interface units transmit information to and from PCI compatible devices.

11. A fault-detecting digital data processing apparatus according to claim 9, wherein the error phase means are responsive to a bus error signaled by any of the functional units for placing the respective functional units in an error phase.

12. A fault-detecting digital data processing apparatus according to claim 9, wherein the error isolation means includes means for taking off-line a functional unit that signals that it is faulty.

13. A fault-detecting digital data processing apparatus according to claim 9, wherein the bus error detecting means of at least one functional unit comprises loopback error detection means, coupled to the respective bus means and error phase means, for comparing test data transmitted onto that bus means with data received substantially concurrently from the bus means, and for signaling a bus error to the other functional units in the event of discrepancy between the transmitted and received data.

14. A method of operating a digital data processor of a type having plural functional units, the method composing the steps of:
- providing communications between respective pairs of functional units,
- selectively placing each functional unit in an error isolation phase substantially concurrently with each other functional unit,
- during the error isolation phase, transmitting test data from each function unit onto a respective bus during a respective portion of that phase and exclusive, with respect to that portion, of any other unit connected to that bus,
- with each functional unit, monitoring the respective bus for detecting a communication error, including any of parity error, an error correction code error and a loopback error, on that bus, and signaling a bus error to the other functional units in the event of such communication error,
- signaling the other functional units that the respective functional unit is faulty based on (i) whether that functional unit detected a loopback error, (ii) whether another functional unit signaled a bus error in response to test data transmitted during the error isolation phase, and (iii) whether another functional unit signaled that it was faulty.

15. A method according to claim 14, including the step of placing each functional unit in the error isolation phase in response to a bus error signaled by any of the functional unit.

16. A method according to claim 14, including the step of taking off-line a functional unit that has signaled that it is faulty.

17. A method according to claim 16, including the step of detecting a loopback error by test data transmitted onto the respective bus of a functional unit with data received substantially concurrently from that bus, and for signaling a bus error to the other functional units in the event of discrepancy between the transmitted and received data.

* * * * *